(12) United States Patent
Schuster et al.

(10) Patent No.: US 6,857,072 B1
(45) Date of Patent: Feb. 15, 2005

(54) SYSTEM AND METHOD FOR ENABLING ENCRYPTION/AUTHENTICATION OF A TELEPHONY NETWORK

(75) Inventors: Guido M. Schuster, Des Plaines, IL (US); Jacek A. Grabiec, Chicago, IL (US); Ikhlaq S. Sidhu, Vernon Hills, IL (US); Sagan S. Sidhu, Vernon Hills, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/405,981

(22) Filed: Sep. 27, 1999

(51) Int. Cl.[7] .............................. H04L 9/00
(52) U.S. Cl. ...................... 713/160; 380/277
(58) Field of Search ................... 380/277; 713/160

(56) References Cited

U.S. PATENT DOCUMENTS

| | | | |
|---|---|---|---|
| 4,313,035 A | | 1/1982 | Jordan et al. |
| 4,953,198 A | | 8/1990 | Daly et al. ................. 379/61 |
| 5,249,230 A | * | 9/1993 | Mihm, Jr. .................. 380/249 |
| 5,428,663 A | | 6/1995 | Grimes et al. |
| 5,448,623 A | | 9/1995 | Wiedeman et al. |

(List continued on next page.)

FOREIGN PATENT DOCUMENTS

| | | |
|---|---|---|
| DE | 198 13 179 A 1 | 9/1999 |
| EP | 0 578 374 A1 | 8/1993 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

Sidhu, Iklaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

(List continued on next page.)

*Primary Examiner*—Gregory Morse
*Assistant Examiner*—Christopher J Brown
(74) *Attorney, Agent, or Firm*—McDonnell Boehnen Hulbert & Berghoff LLP

(57) ABSTRACT

A system and method for enabling encryption and/or authentication services on a telephony network. A portable information device, such as a personal digital assistant is used to exchange encryption and/or authentication data with a second portable information device. The portable information devices may be linked to the telephony network to enable encryption and/or authentication services using the encryption and/or authentication data exchanged by the portable information devices.

19 Claims, 13 Drawing Sheets

U.S. PATENT DOCUMENTS

| | | | |
|---|---|---|---|
| 5,497,339 A | 3/1996 | Bernard | 364/705.05 |
| 5,557,658 A | 9/1996 | Gregorek et al. | 379/67 |
| 5,563,937 A | 10/1996 | Bruno et al. | |
| 5,606,594 A | 2/1997 | Register et al. | 379/58 |
| 5,646,945 A * | 7/1997 | Bergler | 370/419 |
| 5,686,904 A * | 11/1997 | Bruwer | 340/5.23 |
| 5,727,057 A | 3/1998 | Emery et al. | 379/211 |
| 5,732,074 A | 3/1998 | Spaur et al. | |
| 5,732,216 A | 3/1998 | Logan et al. | |
| 5,742,905 A | 4/1998 | Pepe et al. | 455/461 |
| 5,838,665 A | 11/1998 | Kahn et al. | 370/260 |
| 5,850,433 A | 12/1998 | Rondeau | 379/201 |
| 5,875,405 A | 2/1999 | Honda | |
| 5,894,473 A | 4/1999 | Dent | |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | |
| 5,933,778 A | 8/1999 | Buhrmann et al. | 455/461 |
| 5,938,757 A | 8/1999 | Bertsch | |
| 5,960,340 A | 9/1999 | Fuentes | |
| 5,991,394 A | 11/1999 | Dezonno et al. | |
| 6,006,272 A | 12/1999 | Aravamudan et al. | |
| 6,031,904 A | 2/2000 | An et al. | |
| 6,034,621 A | 3/2000 | Kaufman | 340/825.44 |
| 6,075,992 A | 6/2000 | Moon et al. | |
| 6,094,681 A | 7/2000 | Shaffer et al. | 709/224 |
| 6,161,134 A | 12/2000 | Wang et al. | |
| 6,163,598 A | 12/2000 | Moore | |
| 6,175,860 B1 | 1/2001 | Gaucher | |
| 6,216,158 B1 | 4/2001 | Luo et al. | |
| 6,240,097 B1 | 5/2001 | Weslock et al. | |
| 6,275,574 B1 * | 8/2001 | Oran | 379/201.01 |
| 6,301,609 B1 | 10/2001 | Aravamudan et al. | |
| 6,308,201 B1 | 10/2001 | Pivowar et al. | |
| 6,359,892 B1 | 3/2002 | Szlam et al. | |
| 6,404,746 B1 * | 6/2002 | Cave et al. | 370/262 |
| 6,411,965 B2 | 6/2002 | Klug | |
| 6,553,037 B1 | 4/2003 | Pivowar et al. | 370/463 |

OTHER PUBLICATIONS

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

International Search Report for PCT Application Serial No. PCT/US00/26618, Dated Feb. 19, 2001.

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON–BrainPad*, Proceedings 13th Tron Project International Symposium, Online!, (Dec. 4–7, 1996), pps. 95–103.

Gessler, Stefan et al., *PDAs as Mobile WWW Browsers*, Computer Networks and ISDN Systems, vol. 28, No. 1, (Dec. 1995), pps. 53–59.

International Search Report for PCT Application Serial No. PCT/US00/26650, Dated Feb. 19, 2001.

International Search Report for PCT Application Serial No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151–157.

International Search Report for PCT Application Serial No. PCT/US00/26649, Dated Feb. 6, 2001.

Hansson, Allan et al., *Phone Doubler—A Step Towards Integrated Internet and Telephone Communities*, Ericsson Review, No. 4, 1997, pps. 142–152.

Zellweger, Polle T. et al. *An Overview of the Etherphone System and Its Applications*, Xerox Palo Alto Research Center (Mar. 1988), pps. 160–168, XP 000617541.

Terry, Douglas B. et al. *Managing Stored Voice In the Etherphone System*, Xerox Palo Alto Research Center vol. 1, (Feb. 1998), pps. 3–27, XP 000032477.

Terry, Douglas B. et al. *Managing Stored Voice In the Etherphone System*, Operating Systems Review (SIGOPS), US, ACM Head Quarter, New York, NY. Vol. 21, No. % (Nov. 8, 1987), pps. 103–104, XP 000005196.

U.S. patent application Ser. No. 09/451,388, Schuster et al., filed Nov. 30, 1999.

U.S. patent application Ser. No. 09/406,231, Schuster et al., filed Sep. 27, 1999.

U.S. patent application Ser. No. 09/515,365, Schuster et al., filed Feb. 29, 2000.

U.S. patent application Ser. No. 09/406,320, Schuster et al., filed Sep. 27, 1999.

U.S. patent application Ser. No. 09/515,797, Schuster et al., filed Feb. 29, 2000.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed May 31, 2000.

U.S. patent application Ser. No. 09/515,969, Schuster et al., filed Feb. 29, 2000.

U.S. patent application Ser. No. 09/406,322, Schuster et al., filed Sep. 27, 1999.

U.S. patent application Ser. No. 09/406,152, Schuster et al., filed Sep. 27, 1999.

U.S. patent application Ser. No. 09/406,128, Schuster et al., filed Sep. 29, 1999.

U.S. patent application Ser. No. 09/515,387, Schuster et al., filed Feb. 29, 2000.

U.S. patent application Ser. No. 09/515,970, Schuster et al., filed Feb. 29, 2000.

U.S. patent application Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.
U.S. patent application Ser. No. 09/406,066, Schuster et al., filed Sep. 27, 1999.
U.S. patent application Ser. No. 09/515,795, Schuster et al., filed Feb. 29, 2000.
U.S. patent application Ser. No. 09/516,269, Schuster et al., filed Feb. 29, 2000.
U.S. patent application Ser. No. 09/515,366, Schuster et al., filed Feb. 29, 2000.
U.S. patent application Ser. No. 09/470,879, Schuster et al., filed Dec. 22, 1999.
U.S. patent application Ser. No. 09/707,708, Schuster et al., filed Nov. 7, 2000.
U.S. patent application Ser. No. 09/677,077, Schuster et al., filed Sep. 29, 2000.
U.S. patent application Ser. No. 09/584,927, Schuster et al., filed May 31, 2000.
U.S. patent application Ser. No. 09/726,993, Schuster et al., filed Nov. 30, 2000.
U.S. patent application Ser. No. 09/728,833, Schuster et al., filed Nov. 30, 2000.
"Understanding Packet Voice Protocols"; The International Engineering Consortium; http://www.iec.org.

* cited by examiner-

SYSTEM AND METHOD FOR ENABLING ENCRYPTION/AUTHENTICATION OF A TELEPHONY NETWORK

BACKGROUND OF THE INVENTION

A. Field of the Invention

The present invention is related to a method and system for providing communication services over a network. In particular, the present invention relates to a system and method for enabling encryption and/or authentication on a telephony network.

B. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller l.D: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Data network telephones and the data network (e.g. Internet) system in which they operate, however, lack a substantial infrastructure and service providers for providing telephone service.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that enables encryption and/or authentication on the telephony system. Users may participate in transactions with each other using more secure data channels. Sensitive data may be transmitted more safely across public networks.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

The following references to patent applications filed concurrently herewith are incorporated be reference:

"System and Method for Controlling Telephone Service Using a Wireless Personal Information Device" to Schuster, et al.

"System and Method for Advertising Using Data Network Telephone Connections" to Schuster, et al.

"System and Method for Providing User-Configured Telephone Service in a Data Network Telephony System" to Sidhu, et al.

"System and Method for Accessing a Network Server Using a Portable Information Device Through a Network Based Telecommunication System" to Schuster, et al.

"System and Method for Interconnecting Portable Information Devices Through a Network Based Telecommunication System" to Schuster, et al.

"System and Method for Using a Portable Information Device to Establish a Conference Call on a Telephony Network" to Schuster, et al.

"System and Method for Associating Notes with a Portable Information Device on a Network Telephony Call" to Schuster, et al.

"System and Method for Providing Shared Workspace Services Over a Telephony Network" to Schuster, et al.

"System and Method for Providing Service Provider Configurations for Telephones in a Data Network Telephony System" to Schuster, et al.

The following additional references are also incorporated by reference herein:

"Multiple ISP Support for Data Over Cable Networks" to Ali Akgun, et al.

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313

A. PID-Enabled Data Network Telephony System

Figure 1:
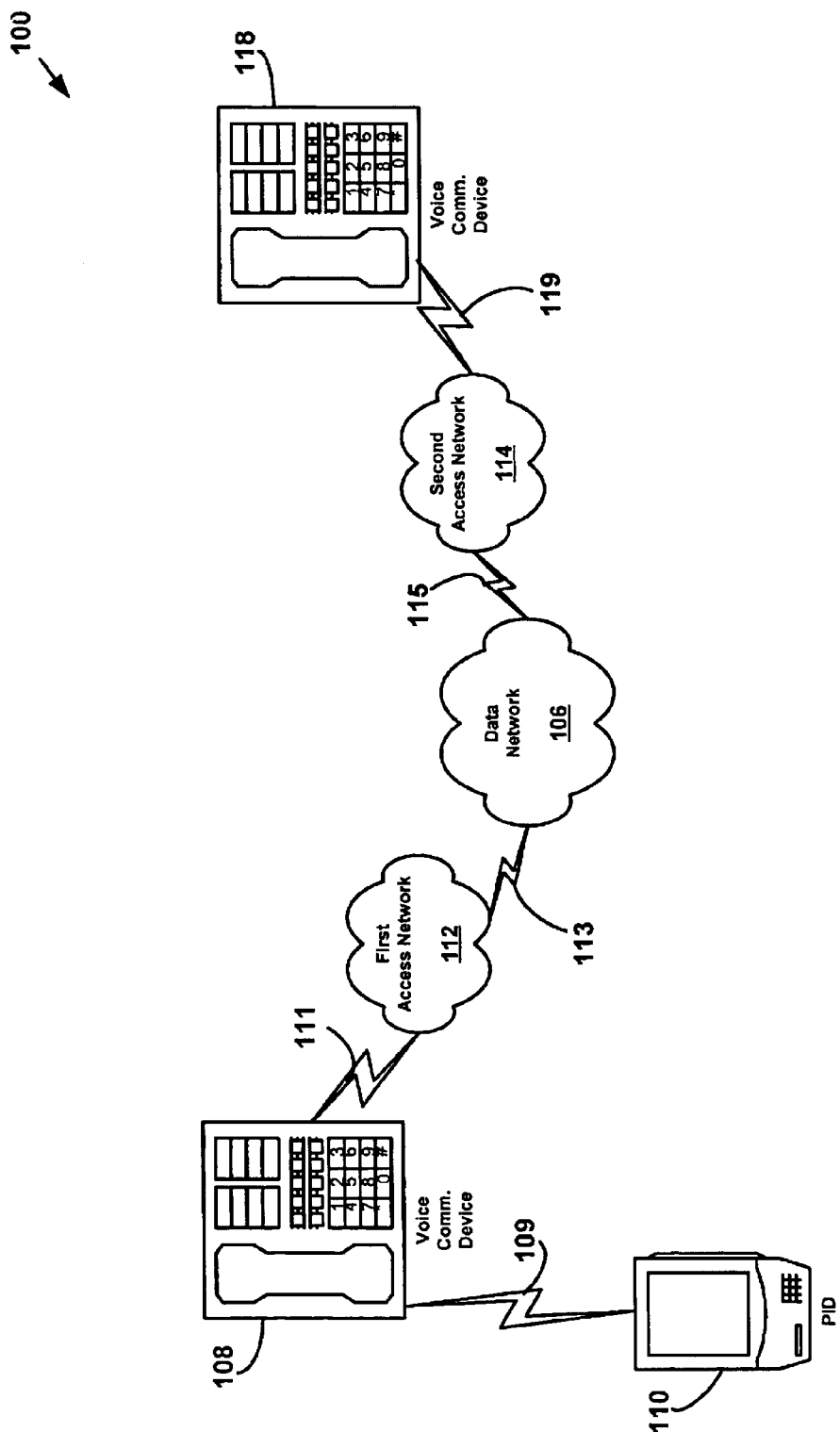
FIG. 1 is block diagram of a network telephony system according to one embodiment of the present invention.

FIG. 1 is a block diagram showing an exemplary embodiment of a system 100 for enabling encryption and/or authentication on a telephony network according to the present invention. The system includes a data network 106. A first voice communication device 108 is linked to a first access network 112 via connection 111, and may communicate over the data network 106 by connecting via the first access network 112. A second voice communication device 118 is linked to a second access network 114 through connection 119 and may communicate over the data network 106 by connecting via the second access network 114.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF). In addition, an Internet Telephony gateway may be included within the system 100 to allow for voice connections to users connected by subscriber lines at a PSTN Central Office.

Figure 3:
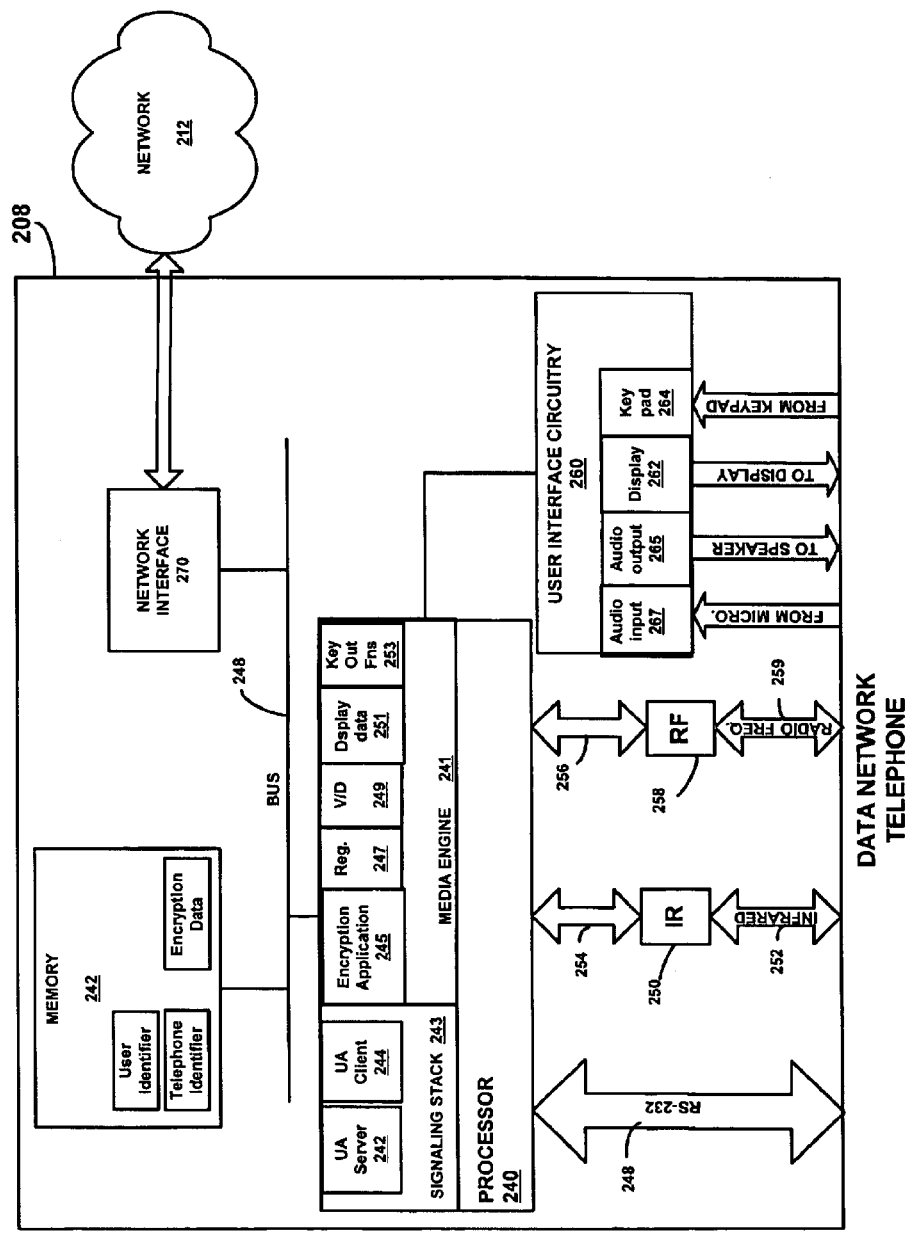
FIG. 3 is a block diagram of a data network telephone according to an exemplary embodiment of the present invention.

The voice communication devices 108 and 118 typically include a voice input, a voice output, and a voice processing system (described further below with reference to FIG. 3, illustrating an exemplary embodiment of the voice communication devices). The voice processing system converts voice sound to digital data signals that are communicated on a voice connection over the data network. The voice processing system also converts digital data signals received from the voice connection to voice sound. The voice communication devices 108 and 118 typically include a central processing unit and memory to store and process computer programs. Additionally, each of the voice communication devices 108 and 118 typically includes a unique network address, such as an IP address, in memory to uniquely identify the voice communication device 108 or 118 to the data network 106 and to permit data packets to be routed to the device.

A PID 110 is shown linked to the first voice communication device 108 via a link 109. The PID 110 may communicate information to the second voice communication device (or a second PID linked to the second voice communication device 118) over the data network 106 by connecting through the first voice communication device 108 and across the first access network 112. It should be noted that although the PID 110 is shown as part of the system 100, communication is still possible in the absence of PID 110. Additional telephony services, such as encryption and/or authentication services, may be introduced with the use of one or more PIDs, such as PID 110.

The PID 110 preferably contains user attributes stored in a user information database. The user attributes may contain such information as a user identifier, schedule information, contact information (including encryption and/or authentication keys corresponding to one or more of the contacts), and other information that is associated with a user of the PID 110. The PID 110 includes a user interface allowing a user to enter and retrieve data. In a preferred embodiment, the user interface includes a pressure-sensitive display that allows a user to enter input with a stylus or other device. An example of a PID with such an interface is a PDA (Personal Digital Assistant), such as one of the Palm™ series of PDAs offered by 3Com® Corporation. The PID 110 may include other functionality, such as wireless phone or two-way radio functionality.

Link 109 is a point-to-point link, and may be entirely or partially wireless, or it may be a hard-wired connection. The link 109 is preferably a wireless link, such as an infrared link specified by the Infrared Data Association (IrDA) or a radio frequency (RF) link, such as a link according to the Bluetooth specification. However, the point-to-point link might also be a hardwired connection, such as an RS-232 serial port.

In one embodiment, the voice communication devices 108 and 118 each include a handset with a receiver and transmitter similar or identical to handsets of traditional circuit-switched telephones. A console on which the handset sits may include the voice processing system, a display, and a keypad for example.

In a preferred embodiment, a portion of each of the voice communication devices 108 and 118 utilize an NBX 100™ communication system phone offered by 3Com® Corporation. In alternative embodiments, the voice communication devices 108 and 118 may include any device having voice communications capabilities. For example, a personal computer having a microphone input and speaker output may be used to implement either of the voice communication devices 108 or 118. Other configurations are also intended to be within the scope of the present invention.

The details relating to operation of the voice communication devices 108 and 118 depend on the nature of the data network 106 and the nature of the access networks 112 and 114 connecting the voice communication devices 108 and 118 to each other and/or to other network entities. The access networks 112 and 114 typically include any high-bandwidth network adapted for data communications, i.e. a network having greater than 64,000 bits-per-second (bps) bandwidth. The access networks 112 and 114 may link to the voice communication devices 108 and 118 using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112 and 114 may also include the PSTN and link to the voice communications devices 108 and 118 by an analog modem. Further details regarding specific implementations are described below, with reference to FIGS. 2 through 13.

B. System for Enabling Encryption/Authentication on a Telephony Network

One advantage of the PID-Enabled Data Network Telephony System 100 in FIG. 1 is that it may be used to provide encryption and/or authentication services. In one embodiment, the PID 110 is able to determine and exchange encryption and/or authentication data, such as a public encryption and/or authentication keys or shared secret keys, with a second PID, such as a PID associated with a user of the second voice communication device 118, over a privacy network, such as an IrDA network or a Bluetooth radio frequency network. IrDA and Bluetooth will be describe in more detail with reference to FIGS. 2 and 3. The encryption and/or authentication data can then be stored in the PID 110 to enable encryption and/or authentication of future communications with a user associated with the second PID. The encryption and/or authentication data can be communicated across the link 109 to the first voice communication device 108. The first voice communication device 108 can use the encryption and/or authentication data to encrypt voice or other data communications bound for the second voice communication device, where the encryption and/or authentication is performed according to a predetermined encryption and/or authentication algorithm. Call set-up/management signaling can also be encrypted if desired.

1. Local Area Network as an Exemplary Access Network

Figure 2:
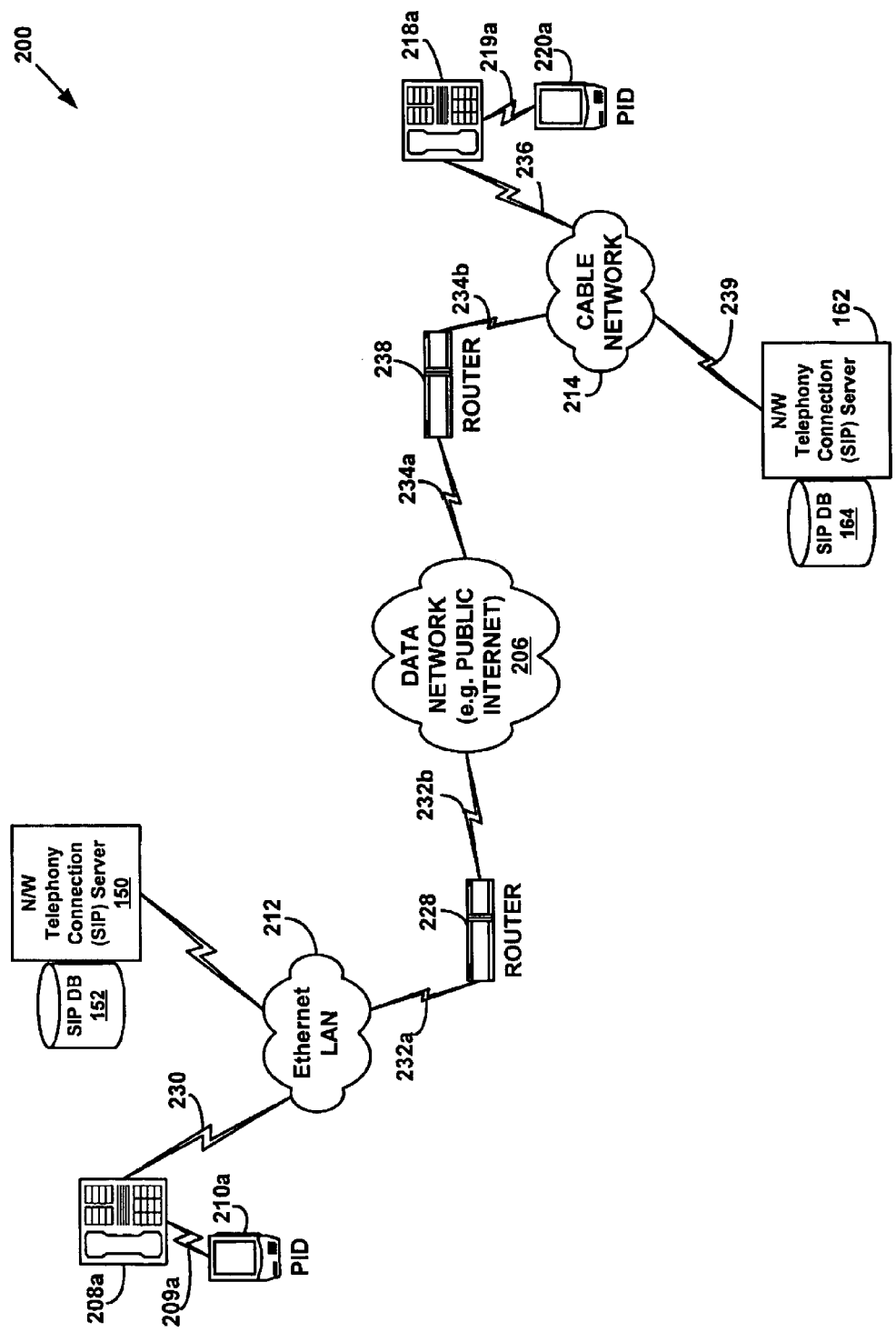
FIG. 2 is a block diagram showing a system for enabling encryption and/or authentication on a telephony network according to an exemplary embodiment of the present invention.

FIG. 2 is a block diagram showing an example of the system 100 of FIG. 1 for enabling encryption and/or authentication according to the present invention. The system 200 in FIG. 2 includes a local area network 212, connected to a data network 206 by a first router 228 through connections 232a and 232b. A cable network 214 is connected to the data network 206 by a second router 238 through connections 234a and 234b. Those of ordinary skill in the art will appreciate that while FIG. 2 illustrates the access networks as the local area network 212 and the cable network 214, any other type of network may be used. For example, the local area network 212 and/or the cable network 214 may be replaced by ISDN, DSL, or any other high-speed data link.

The local area network 212 provides data connectivity to its network elements, such as a first data network telephone 208a and a first network telephony connection server 150. Additional network elements, such as additional data network telephones (not shown in FIG. 2) may also be present on the local area network 212. The local area network 212 in FIG. 2 is an Ethernet LAN operating according to the IEEE 802.3 specification, which is incorporated by reference herein; however, any other type of local area network may be used. The local area network 212 uses the router 228 to provide the first data network telephone 208a and the first network telephony connection server 150 with access to the data network 206. For example, the router 228 may perform routing functions using protocol stacks that include the Internet Protocol and other protocols for communicating on the Internet.

The first network telephony connection server 150 provides telephony registration, location and session initiation services for voice connections in which its members are a party. A user may register for telephony service with an administrator of the first network telephony connection server 150 and receive a user identifier and a telephone identifier. The user identifier and telephone identifier may be sequences of unique alphanumeric elements that callers use to direct voice connections to the user. The first network telephony connection server 150 may register users by storing user records in a first registration database 152 in response to registration requests made by the user. Alternatively, registration information may be stored and maintained by a separate location server that may be accessed by the first network telephony connection server 150. A second network telephony connection server 162 and a second registration database 164 provide similar services to network elements on the cable network 214 as the first network telephony connection server 150 and database 152 provide on Ethernet LAN 212.

The call setup process and the user and telephone identifiers preferably conform to requirements defined in a call management protocol. The call management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed using a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein. However, any other such protocol may be used. Other protocols include H.323, the Media Gateway Control Protocol (MGCP), MEGACO, etc.

The first network telephony connection server 150 may be used to provide telephony service for mobile users. A user may be registered to use the first network telephone 208a (which is identified by its telephone identifier), but the user may move to a location near an alternate network telephone (not shown) on the Ethernet LAN 212. The user may re-register as the user of the alternate network telephone so that calls that identify the user by the user's user identifier may reach the user at the alternate network telephone.

2. Cable Network as an Exemplary Access Network

The system 200 in FIG. 2 also shows a cable network 214 connected to the data network 206 by a router 238 and connections 234a and 234b. The cable network 214 provides data network access to its network elements, which in FIG. 2 include a second data network telephone 218a and the second network telephony connection server 162. A user of the second data network telephone 218a connected to the cable network 214 may communicate over the data network 206 with a user of the first data network telephone 208a connected to the local area network 212.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

3. Providing Telephony Services

The second network telephony connection server 162 is preferably a SIP-based server that performs call initiation, maintenance, and tear down for data network telephones, such as the second data network telephone 218a connected to the cable network 214. The second network telephony connection server 162 may be similar or identical to the first network telephony connection server 150 connected to the local area network 212.

The system 200 shown in FIG. 2 permits the first data network telephone 208a connected to the local area network 212 to communicate with the second data network telephone 218a connected to the cable network 214. The system shown in FIG. 2 uses the SIP call management protocol to establish, maintain, and tear down telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection server 150 and 162. Not all server types are required to implement the embodiments of the present invention. The communication services to be provided will determine which servers are present in the communication system. Preferred embodiments of the present invention may be carried out using proxy servers.

One example of a SIP operation involves a SEP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used. Portions of SIP messages may be encrypted, such as by using PGP encryption as described in M. Handley et al., "SIP: Session Initiation Protocol," IETF RFC 2543, March 1999, p. 118.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several data network telephones at once until somebody takes the call. Registrar servers are used to record the SIP address (the SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the first network telephony server 150, is the primary destination of all SIP messages trying to establish a connection with users on the local area network 212. Preferably, the first network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the first SIP database 152. It also allows all mobile clients to register with their current locations.

Similarly, the second network telephony server 162 is the primary destination of all SIP messages trying to establish a connection with the second data network telephone 218a connected to the cable network 214. Preferably, the second network telephony server 162 is also the only destination advertised to the SIP clients outside the cable network 214 on behalf of all the SIP clients (e.g. data network telephones) residing on the cable network 214. The second network telephony server 162 relays all SIP INVITE messages to the appropriate final destination (or another SIP proxy), based on a database lookup using the second SIP database 164.

The data network telephones 208a and 218a in the system 200 preferably have pre-programmed device identifiers (e.g. phone numbers), represented as SIP-URL's that are of the form sip: user@domain. Examples are sip: 8475551212@, 3Com.com or sip: johndoe@, 3Com.com. After power-up, each of the data network telephones 208a and 218a sends a SIP REGISTER message to a default registrar, such as one of the network telephony servers 150 and 162. When a call arrives at one of the network telephony servers 150 or 162 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephones 208a or 218a are running the DHCP (Dynamic Host Configuration Protocol) so that when the location is changed, the IP address is also automatically changed.

An advantage of the system in FIG. 2 is that once a call is established between data network telephones, the data network 206 provides data connectivity for a plurality of data communications channels. For example, the data network telephones 208a and 218a can communication voice signals amongst each other as voice-over-data packets on voice-over-data channels. The data network telephones 208a and 218a can also communicate user data, such as graphical data, as user data packets on user data channels. For example, graphical data may be communicated to and from first and second PIDs 210a and 220a across links 209a and 219a to the data network telephones 208a and 218a, where the graphical data may be assembled into packets for transmission, and disassembled from packets at reception, as part of the process for communicating the graphical data packets across the data network 206 and any access networks, such as the Ethernet LAN 212 and the cable network 214. Other data channels besides voice-over-data channels and graphical data channels may also be provided and used for data transport.

4. The Data Network Telephones

The first data network telephone 208a is preferably a telephone that includes an Ethernet communications interface for connection to an Ethernet port. The second data network telephone 218a is preferably a telephone that includes a cable network interface (such as a cable modem system) for connection to the cable network 214 via connection 236. The data network telephones in FIG. 2 preferably support the Internet Protocol (IP), using an IP address that is either statically configured or obtained by access to a Dynamic Host Configuration Protocol (DHCP) server, which is not shown in FIG. 2.

FIG. 3 is a block diagram showing the first data network telephone 208a connected to the local area network 212 in FIG. 2. In the example of FIG. 2, the network interface circuitry in the second data network telephone 218a would differ slightly from that of the first data network telephone 208a shown in FIG. 3. The data network telephone 208a in FIG. 3 is connected to the network 212 by a network interface 270. The network interface 270 may, for example, be a network interface card, and may be in the form of an integrated circuit. A bus 248 may be used to connect the network interface 270 with a processor 240 and a memory 242. Also connected to the processor are user interface circuitry 260 and three alternative link interfaces to a PD, such as the PID 210a.

A first alternative link interface 248 includes an RS-232 serial connection and associated coupling hardware and mechanisms. The first alternative link interface 248 may, for example, be a docking cradle for a PID, such as a PDA (Personal Digital Assistant), in which information can be transferred between the PID and the data network telephone 208a. The second alternative link interface comprises a first connection 254, such as an RS-232 connection, along with infrared circuitry 250 for converting signals into infrared output and for accepting infrared input. An infrared interface 252 may also be included within the second alternative link interface. The third alternative link interface comprises a first connection 256, such as an RS-232 connection, along with radio-frequency circuitry 258 for converting signals into radio frequency output and for accepting radio frequency input. A radio frequency interface 259 may also be included as part of the third alternative link interface.

The three alternative link interfaces described above are merely examples, and additional means for implementing the link interface between the first data network telephone 208*a* and the PID 210*a* may also be used. Although three link interfaces are shown in FIG. 3, there may be only one such interface in the data network telephone 208*a*. More than one link interface may be included to improve flexibility and to provide redundancy in case of failure of one of the link interfaces.

The user interface circuitry 260 includes hardware and software components that access the functions of the handset, display, and keypad to provide user input and output resources for functions in the processor 240. The user interface circuitry may include a display interface 262, a keypad interface 264, an audio output interface 265, and an audio input interface 267.

The audio input interface 267 may receive voice signals from a microphone or other audio input device and convert the signals to digital voice information. The conversion preferably conforms to the G.711 *ITU Standard*. Further processing of the digital signal may be performed in the audio input interface 267, such as providing compression (e.g. using G.723.1 standard) or providing noise reduction, although such processing may also be performed in the processor 240. Alternatively, the audio input interface 267 may communicate an analog voice signal to the processor 240 for conversion to digital information within the processor 240.

The audio output interface 265 receives digital information representing voice from the processor 240 and converts the information to audible sound, such as through a magnetic speaker. In one embodiment, the audio output interface 265 receives information in the form of G.711, although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention. In addition, some of the features described here, such as the display and display interface 262, are optional and serve to enhance the functionality of the first data network telephone 208*a*.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software, firmware, or hardware, to implement the functions of the first data network telephone 208*a*. The operating system may be any suitable commercially available embedded or disk-based operating system, or any proprietary operating system.

The processor 240 includes a media engine 241 and a signaling stack 243 to perform the primary communications and application functions of the first data network telephone 208*a*. The purpose of the signaling stack in the exemplary first data network telephone 208*a* is to set up, manage, and tear down a call. During the setup phase, a user may use the keypad to enter a user identifier to call. Alternatively, a PID such as PID 210*a* may transmit the user identifier of the party across the first link 209*a*. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice-over-data channel is established. During the management phase, for example, other parties may be invited to the call if needed. During the tear down phase, the call is terminated.

The signaling protocol used in the data network telephone 208*a* in FIG. 3 is the SIP protocol. In particular, the signaling stack implements a User Agent Client 244 and a User Agent Server 242, in accordance with the SIP protocol. Alternative signaling protocols, such as the ITU-T H.323 protocol, MGCP, MEGACO, and others, may also be used to implement the present invention.

Once the call is set up, the media engine 241 manages the communication over one or more data communications channels using network transport protocols and the network interface 270. The media engine 241 sends and receives data packets having a data payload for carrying data and an indication of the type of data is being transported. The media engine 241 in the first data network telephone 208*a* may sample the voice signals from the audio input 267 (or receive voice samples from the audio input 267 ), encode the samples, and build data packets on the sending side. On the receiver side, in addition to performing the reverse operations, the media engine also typically manages a receiver buffer to compensate for network jitter. Similar procedures may be performed for other types of data, such as graphical data.

An encryption application 245 provides encryption and/or authentication services for signaling, or voice or other data communications according to encryption and/or authentication algorithms and user-specified encryption and/or authentication keys. Cryptography techniques are described in more detail below with reference to FIGS. 8-13.

The media engine 241 may also include hardware and software components for performing registration functions 247, voice-over-data functions 249, display data functions 251, and keypad output functions 253. The media engine 241 processes data that is received from the network 212, and data to be sent over the network 241.

For data that is received from the network 212, the media engine 241 may determine from the type of data in the packet (such as by examining a packet header) whether packets contain sampled voice signals or other data types. Packets containing sampled voice signals are processed by the voice-over-data function 249. The voice-over-data function 249 preferably conforms to a protocol for formatting voice signals as digital data streams. While any suitable protocol may be used, the media (i.e. the voice signal) is preferably transported via the Real Time Protocol (RTP), which itself is carried inside of UDP (User Datagram Protocol). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 786, August 1980, and IP is described in J. Postel, ed., "Internet Protocol," IETF RFC 791, September 1981, both of which are incorporated by reference herein.

Packets containing data for use in registering the first data network telephone 208*a* with a network telephony server, such as the first telephony connection server 150, are processed by the registration function 247. By registering the first data network telephone 208a, a user may establish with the network telephony connection server 150 that calls addressed to the user's user identifier may be connected to the first data network telephone 208a. Registration may occur when the first data network telephone 208a sends a request to register to a service provider host, such as the network telephony connection server 150. The service provider host may respond by setting the user's user identifier (such as the user's SIP URL) to correspond to the telephone identifier of the first data network telephone 208a, and by acknowledging the request with a status message to the data network telephone 208a. In one embodiment, a request to register the first data network telephone 208a to a default user is automatically sent during power-up of the first data network telephone 208a.

Other features may be added to the registration functions 247, or implemented as extensions to the registration functions 247. For example, the first data network telephone 208a may be provisioned to provide selected network telephony services by establishing a data connection with a service provider, requesting the selected services, and receiving data that ensures that the services have been successfully provisioned. Such services may include, for example, caller identification, call forwarding, voice mail and any other services offered by the network telephony service provider to enhance the capabilities of the first data network telephone 208a. One advantage of provisioning functions is that services may be ordered for temporary use in a manner convenient to the user.

Packets containing data for display on a display device of the first data network telephone 208a are processed by the display data function 251. The display data function 251 may be used for displaying, for example, the names and user identifiers of other parties to the call, the status of the telephone call, billing information, and other information.

For data to be sent over the data network 212, the media engine 241 formats the data as data packets in accordance with a selected protocol. The data packets may be encrypted by the encryption application 245 using encryption and/or authentication data received from a linked PID, such as the first PD 210a. The selected protocol for formatting the packets is preferably a protocol that is supported by data network telephones that will receive the data being transported.

The voice-over-data function 249 formats voice samples according to the protocol used by the receiving data network telephone. In one preferred embodiment, the voice over data function 249 formats voice samples as RTP packets. The registration function 247 and the keypad output function 253 may control the transport of data that does not represent voice signals.

The second data network telephone 218a is preferably similar or identical to the first data network telephone 208a. For each of the data network telephones 208a and 218a, many of the features described in FIG. 3 are optional and their inclusion depends on the services to be offered.

5. The Portable Information Devices (PIDs)

Figure 4:
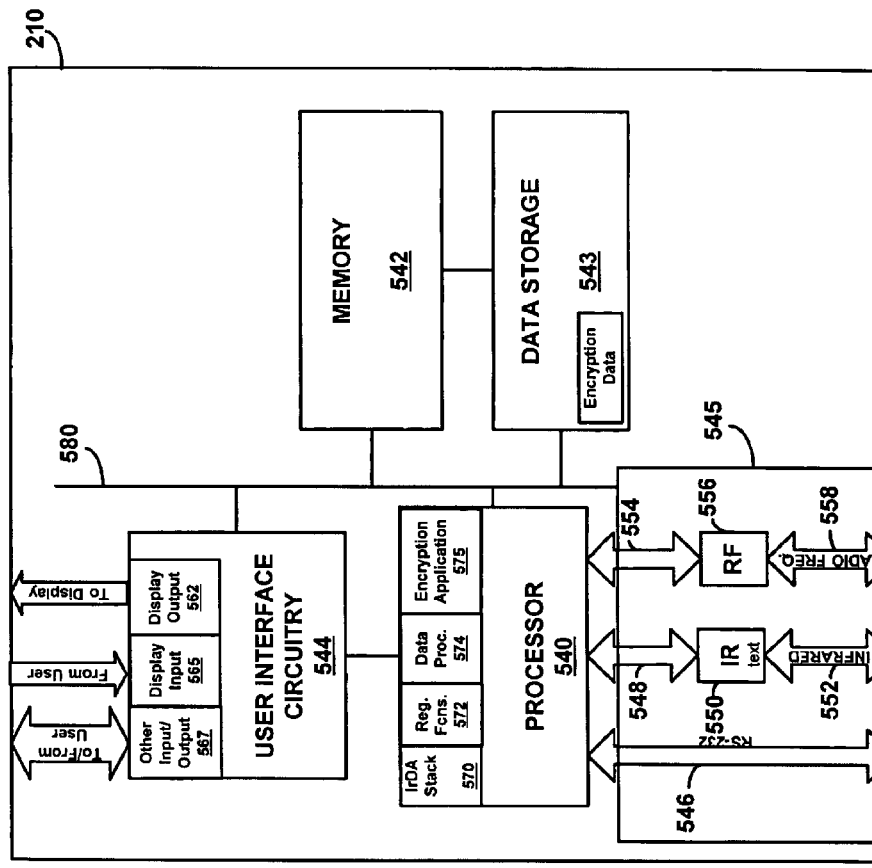
FIG. 4 is a block diagram of a portable information device (PID) according to an exemplary embodiment of the present invention.

FIG. 4 is a block diagram showing the exemplary PID 210a that can communicate via the link 209a with the data network telephone 208a connected to the LAN 212 through connection 230. The PID 210a may be linked to the data network telephone 208a through a link interface 545. A bus 580 may be used to connect the point-to-point interface 545 with a processor 540, a memory 542, data storage 543, and user interface circuitry 544.

The link interface 545 shown in FIG. 4 illustrates three alternative link interfaces for establishing a link to a data network telephone, such as the data network telephone 208a.

A first alternative link interface 546 includes an RS-232 serial connection and associated coupling hardware mechanisms. The first alternative link interface 546 may, for example, be for coupling with a PID docking cradle, in which information can be transferred between the PID and the data network telephone 208a. The second alternative link interface comprises a first connection 548, such as an RS-232 serial connection, along with infrared circuitry 250 for converting signals into infrared output and for accepting infrared input. An infrared interface 552 may also be included within the second alternative link interface. The third alternative link interface comprises a first connection 554, such as an RS-232 connection, along with radio-frequency circuitry 556 for converting signals into radio frequency output and for accepting radio frequency input. A radio frequency interface 558 may also be included as part of the third alternative interface. The radio interface 554/556/558 may be implemented according to the Bluetooth specification, described at www.bluetooth.com.

The three alternative link interfaces described above are merely exemplary, and additional means for implementing the interface between the PID 210a and the first data network telephone 208a may also be utilized. Although three link interfaces are shown in FIG. 4, there may be only one such interface in the PID 210a. More than one link interface may be included to improve flexibility and to provide redundancy in case of failure of one of the link interfaces.

The user interface circuitry 544 includes hardware and software components that provide user input and output resources for functions in the processor 540. The user interface circuitry preferably includes a display output 562, a display input 565, and an additional input/output interface 567.

The display output 562 preferably receives digital information representing graphical data from the processor 540 and converts the information to a graphical display, such as text and/or images, for display on a display screen, for example.

The display input 565 may receive data inputs, such as graphical data inputs, from a user of the PID 210a. The graphical data inputs are preferably entered by the user with a stylus on a pressure-sensitive display screen, and may include text, drawings, or other objects that are capable of being graphically presented.

The additional input/output interface 567 allows the user to enter other types of data besides graphical data into the PID 210a. For example, audio data, additional graphical data, or other input, such as video camera input for example, may be entered through the additional input/output interface 567. Touch-sensitive screen buttons are an exemplary method for a user to enter control data into the PID 210a.

The processor 540 may include an operating system, as well as application and communication software, firmware, or hardware, to implement the functions of the PID 210a. The operating system may be any suitable commercially available operating system, or any proprietary operating system. The operating system and software may be stored on data storage 543, in the memory 542, or the may be embedded in the processor 540. An encryption application 575 preferably controls exchange of encryption and/or authentication data with other PIDs, as well as management of encryption and/or authentication data storage, and the provision of encryption and/or authentication data to other devices, such as the first data network telephone 208a. Although the processor 540 is shown connected to the data storage 543 through a bus 580, other configurations may also be used. Similarly, the memory 542 may be configured other than as shown in FIG. 4, and may be embedded within the processor 540.

The PID 210a may be able to send and receive data (such as encryption and/or authentication data) to and from the first data network telephone 208a across a point-to-point link, such as the point-to-point link 209a shown in FIG. 1. For example, a user may enter graphical data at the display input 565. The graphical data may be processed in the user interface circuitry 544 or it may go directly to the processor 540 or the memory 542. The processor 540 may also perform processing functions, such as compression. A graphical data application may be used to implement the display input, the display output, and the processing functions. For example, a drawing application may be used to accept graphical data input, the display input 565 from a user drawing with a stylus on the display screen of a PDA. A drawing application could then display the drawing through the display output 562 to enable the user to see a visual representation of the drawing. If the user desires to share the drawing with a second user on the system 200, where the second user is using a different PID such as a second PID 220a, the graphical data from the drawing application can be transmitted through one of the point-to-point interfaces 545, allowing the data to be received by the first data network telephone 208a through the link 209a. An application in the first data network telephone 208a receives the graphical data, which may then be prepared for transmission across the data network 206, such as by the media engine 241 shown in FIG. 3. Preferably the graphical data is converted to graphical data packets and is communicated on a graphical data channel across the LAN 212 through the router 228 across the data network 206 through the second router 238 across the cable network 214 to the second data network telephone 218a. The second data network telephone 218a may then convert the graphical data packets received on the graphical data channel back into graphical data. The graphical data can then be transmitted across the second point-to-point link 219a to the second PID 220a, where it may be displayed on a display screen on the second PID 220a to be viewed by the user of the second PID 220a. The second PID 220a may contain a similar drawing program as that which was referenced to the first PID 210a, allowing the user of the PID 220a to modify the drawing and transmit the modifications back across the point-to-point link to the second data network telephone 218a across the cable network 214 through the second router 238 across the data network 206 through the first router 228 across the LAN 212 to the first data network telephone 208a across the point-to-point link 209a and back to the first PID 210a.

Encryption and/or authentication data (shown as stored in data storage 543 in FIG. 4) can be transmitted from the first PID 210a across the link 209a to the first data network telephone 208a in the same manner as graphical data or other data is transmitted to the data network telephone. An encryption application in the first data network telephone 208a can use the encryption and/or authentication data to encrypt data or signaling communications between the first data network telephone 208a and other network entities, such as the second data network telephone 218a.

The point-to-point link 209a may be a serial bit stream between an application in the first PID 210a and an application in the first data network telephone 208a. For example, the link 209a could be an infrared link that is implemented with minimal stack interpretation. However, the link 209a between PID 210a and the first data network telephone 208a can alternatively be implemented as an infrared link using all or parts of a specialized protocol, such as the Infrared Data Association (IrDA) protocol stack, where data is interpreted through the stack between application-layer processes at each end of the link.

Figure 5:
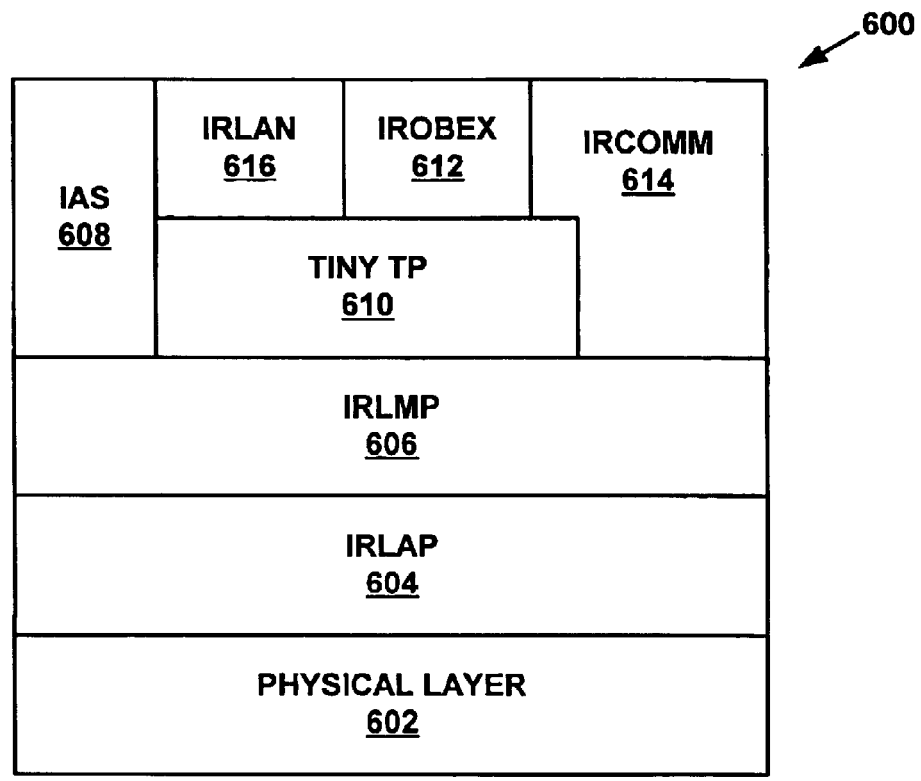
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. The required layers of an IrDA protocol stack are the physical layer 602, the IrLAP layer 604, the IRLMP layer 606 and the LAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http://www.irda.org/standards/specifications.asp and is incorporated by reference herein.

In one embodiment, the data network telephones 208a and 218a merely provide a data tunnel for the data channel attendant to the infrared links, while the IrDA protocol stack is implemented at the endpoint PID devices 210a and 220a. Alternatively, IrDA stacks may be implemented in the data network telephones as well. By implementing additional layers of the IrDA protocol stack, the PID applications and the base applications in the data network telephones can be simplified because the IrDA protocol layers take over certain functions. For example, the IrDA protocol stack can be implemented at each PID 210a and 220a, and the IrOBEX layer 612 can be used to transfer text and graphics object files, such as drawings or electronic business cards, end-to-end between PD devices connected via data network telephones and networks. Embodiments of the present invention are not required to provide IrDA protocol support; however, certain advantages may be realized by implementing IrDA or other similar protocols.

6. Providing Telephony and Encryption/Authentication Services

Figure 6:
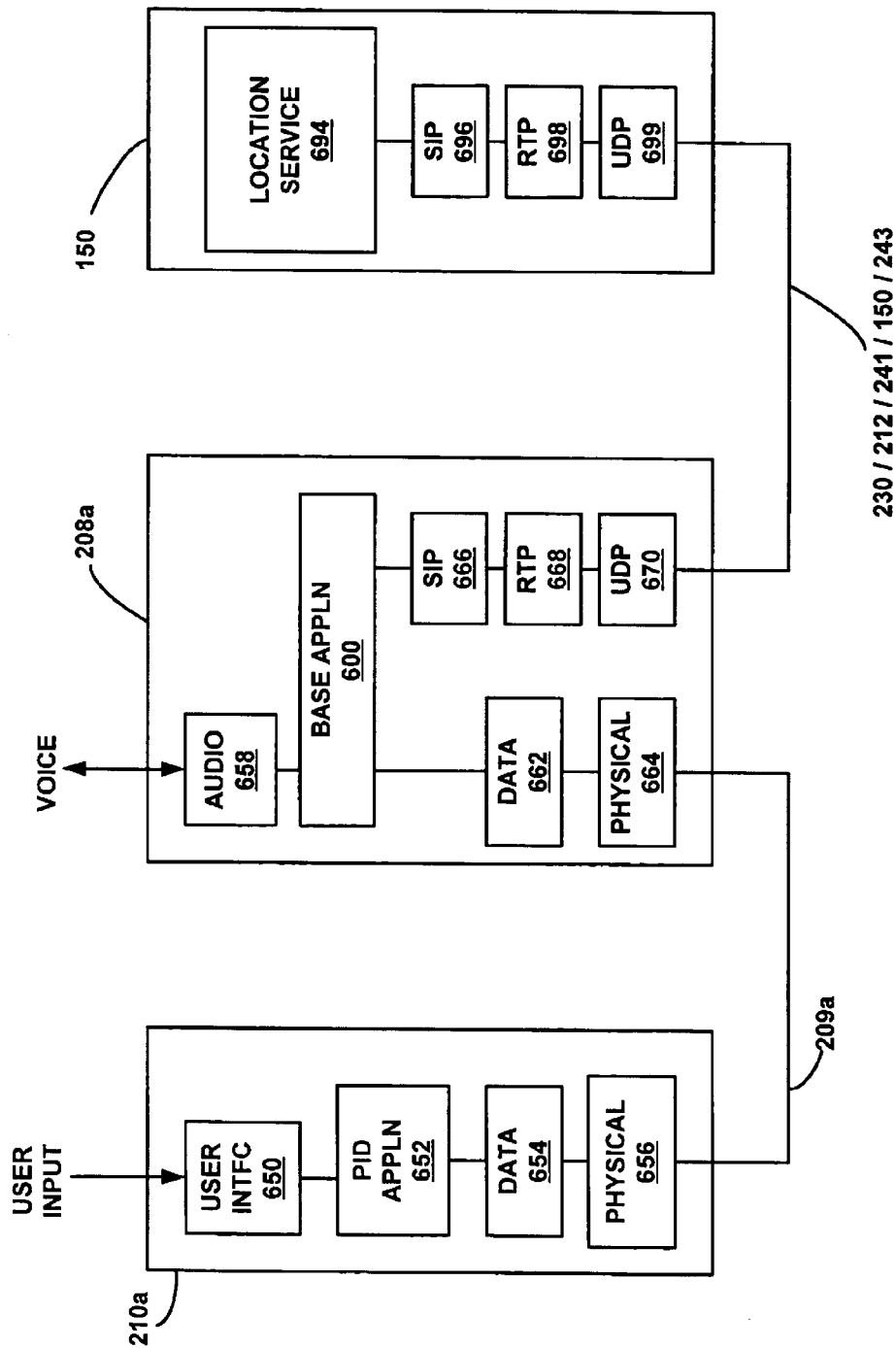
FIG. 6 is a block and stack layer diagram illustrating an embodiment of the protocol stacks in an exemplary embodiment of a PID linked to a data network telephone.

FIG. 6 is a functional block diagram and protocol stack diagram illustrating an embodiment of the protocol stacks in the first PID 210*a* and the first data network telephone 208*a* that support link 209*a*. In the infrared RS-232 embodiment, the link interface circuitry 545 in the PID 210*a* provides the physical layer 656, such as that specified by the Infrared Data Association (IrDA), that connects via link 209*a* to the link interface circuitry 260 implementing a physical layer 664 in the first data network telephone 208*a*. The data link layer 654 in the first PID 210*a* provides data link control for link 209*a* in transferring data to and from a PID application client 652. Similarly, the first data network telephone 208*a* includes a data link layer 662 and a base application server 600 that is configured to synchronize connection and other functions (such as encryption and/or authentication data provision) with the PID application 652 in the first PID 210*a*.

When PID 210*a* is activated, either through power-up or through a user input at the user interface 650, the synchronization application client 652 in the PID 210*a* may send the user's SIP URL across the link 209*a* to the first data network telephone 208*a*, where it is received by the synchronization application server 600. The synchronization application server 600 sends the SIP URL received from the PID 210*a* across connection 230 and the Ethernet LAN 212 through connection 243 to the network telephony connection server 150. The network telephony connection server 150 may store the SIP URL and the IP address of the associated data network telephone 208*a* in the SIP database 152 so that the SIP URL is listed as being resident at the IP address of the data network telephone 208*a*. (If the network telephony connection server 150 uses a location server for registration/ location tasks, the registration information might instead be stored with such a location server). SQL (Structured Query Language) is preferred for querying the database. Once the PID 210*a* is registered with the network telephony connection server 150, calls to the SIP URL for PID 210*a* (or the user of the PID 210*a*) will be directed to the data network telephone 208*a*.

Figure 7:
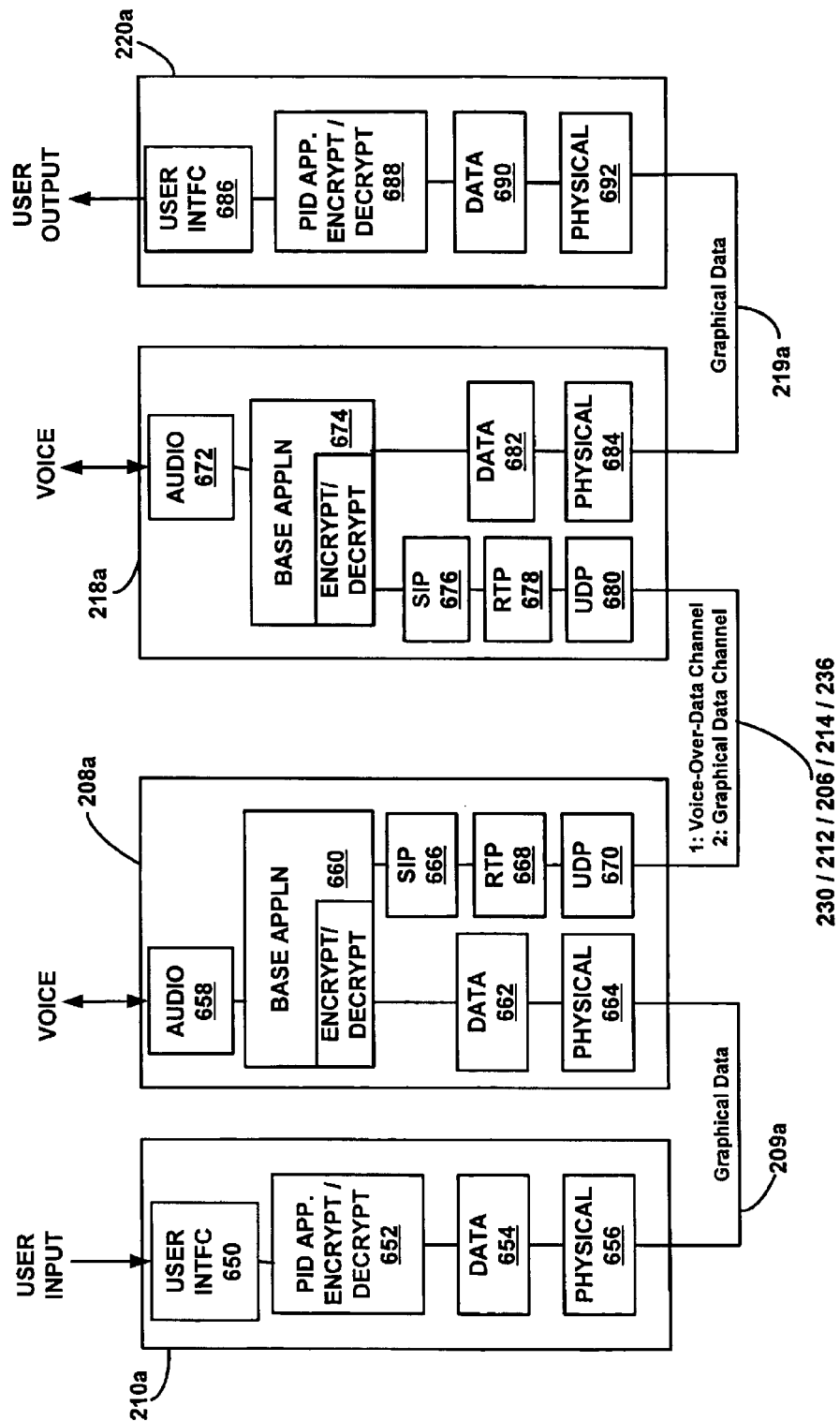
FIG. 7 is block and stack layer diagram illustrating an embodiment of the present invention in which a SIP call may be established.

FIG. 7 is a functional block and protocol stack diagram illustrating an embodiment of the present invention where a SIP connection is established from the first data network phone 208*a* to the second data network phone 218*a* through network connection 230, first access network 212, data network 206, second access network 214 and network connection 236. The routers 228 and 238, and associated connections 232*a–b* and 234*a–b*, are not shown to simplify the block diagram representation.

The diagram of FIG. 7 shows how encrypted user data, such as graphical or audio data, can be passed from one PID to another PID in one aspect of the present invention. The PID application 652 in PID 210*a* is configured to send user data input through the user interface 650 through link 209*a* to base application 660 in the first data network phone 208*a*. In this embodiment, base application 660 is configured to define data channels for transport to the second data network telephone 218*a*.

The PID application 652 also may manage encryption/ decryption data and or authentication data, such as keys, cryptography algorithms, and the exchange and storage of encryption data, decryption data, and authentication data. The encryption/decryption and/or authentication data may be transmitted across the link 209*a* to the first data network telephone 208*a*, where the base application 660 receives the encryption/decryption and/or authentication data and provides encryption and/or authentication services accordingly. The second PID 220*a* and the second data network telephone 218*a* contain similar encryption/decryption and/or authentication applications 688 and 674.

Multiple data channels in SIP may be defined through the Session Description Protocol described in RFC 2327, herein incorporated by reference. Included in a SIP INVITE request for a connection are options for the requested connection that describe the number and type of media streams. Each media stream is described by a "m=" line in the INVITE request. For example, a request for a connection that includes an audio stream and a bidirectional video stream using H.261 might look like this:

TABLE 1

```
v = 0
o = aliec 2890844526 2890844526 IN IP4 host.anywhere.com
c = IN IP4 host.anywhere.com
m = audio 49170 RTP/AVP 0
a = rtpmap:0 PCMU/8000
m = video 51372 RTP/AVP 31
a = rtpmap:31 H261/90000
```

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 7, a first data channel for voice data and a second data channel for user data have been negotiated by the base applications 660 in the first data network telephone 208*a* and the base application 674 in the second data network telephone 218*a*. The base applications 660 and 674 transfer voice data between the AUDIO applications, such as applications including G.711 encoders, in each data network telephone 208*a* and 218*a* via the first data channel. The base application 660 in the first data network telephone 208*a* is also configured to send the user data received via link 209*a* from the first PID 210*a* to the base application 674 in phone 218*a* via the second data channel. The base application in the second data network telephone 218*a* is configured to forward the user data received via the second data channel to the second PID 220*a* via link 219*a*. The PID application 688 in the second PID 220*a* then outputs the user data to the user interface 686 for output to the user of the second PID 220*a*.

The user data in FIG. 7 can take a variety of forms. For example, the user data can be graphical data such as a text file containing information about the user of the first PID 210*a* (e.g. an electronic business card). The user data could also be graphical data in the form of drawing data generated by graphical applications in the first PID 210*a*, where a user drawing on a touchscreen of the user interface 650 in PID 210*a* generates corresponding graphical data that is transmitted via the user data channel to the second PID 220*a* for display on the user interface 686 of the second PID 220*a*. The media description for the user data in the user data channel can be defined during connection setup to establish a connection appropriate to the type of data being transferred. These examples represent just a few of the applications for this aspect of the present invention and should not be viewed as limiting the present invention.

In one embodiment, RTP data packets for two or more types of data are exchanged between the first data network telephone 208*a* and the second data network telephone 218*a* according to one of three possible methods. In the first method, one RTP data channel (or RTP stream) on UDP carries data packets in which both data types are present in a single split packets. Each such split packet contains (1) a source port number and a destination port number in the UDP portion, and (2) a special payload sequentially including each of the data types in the RTP portion. The special payload type can be defined in the SDP described with reference to FIG. 6. Other information is also contained in each packet as well. In the second method for transmitting two or more data types, a separate RTP over UDP data channel is created for each of the different data types, and the RTP header indicates which type of data is contained in each packet. For example, voice data coded as G.711 might be assigned a payload type code of 0, while graphical data is assigned a payload type code of 190. In the third method for transmitting two or more data types, a single RTP/UDP data channel (RTP/UDP stream) is created that contains data packets of two or more different types. In this method, the data types are identified in a payload type field in the RTP header of each packet, enabling an underlying application to identify which data packets are voice data packets and which data packets are graphical data packets, for example.

C. Enabling Encryption/Authentication on a Telephony Network

A cryptographic system for providing encrypted communications typically involves the use of shared secrets. An enciphering transformation, $E_K$, may be defined as follows:

$$E_k: M \rightarrow C,$$

where M is a plaintext message space, C is a ciphertext message space, K is a key space, and k is a member of the key space K. A Deciphering transformation, $D_K$, may be defined as:

$$D_k: C \rightarrow M.$$

Each deciphering transformation $D_t$ is defined by a deciphering algorithm D and a key k. For a given key k, $D_k$ is the inverse of $E_k$, such that the following is true:

$$D_k(E_k(M)) = M$$

for any plaintext message M. Additional details regarding enciphering and deciphering transformations can be found in Denning, Dorothy E., *Cryptography and Data Security*, Addison-Wesley, Reading, Mass., 1983.

A symmetric (one-key) cryptosystem involves enciphering and deciphering keys that are the same, or that are easily determinable from each other. The transformations $D_k$ and $E_k$ might therefore be also easily derived from each other, if the general method of encryption and/or authentication is known. The DES (Data Encryption Standard) is an example of such a symmetric cryptosystem.

An asymmetric (two-key) cryptosystem requires enciphering and deciphering keys that differ in such a way that at least one key is computationally infeasible to determine from the other. As a result, one of the transformations $D_k$ or $E_k$ can be revealed without endangering the other transformation. A public-key encryption and/or authentication system requires each user to have two keys: a public key and a private key. This allows any two users to communicate with each other knowing only each other's public keys.

Each user A in a public-key encryption and/or authentication system has a public enciphering transformation $E_A$, and a private deciphering transformation $D_A$, which is known only to the user A. The private transformation $D_A$ is described by a private key, and the public transformation $E_A$ by a public key derived from the private key by a one-way transformation. It must be computationally infeasible to determine $D_A$ from $E_A$, or to find a transformation equivalent to $D_A$.

Figure 8:
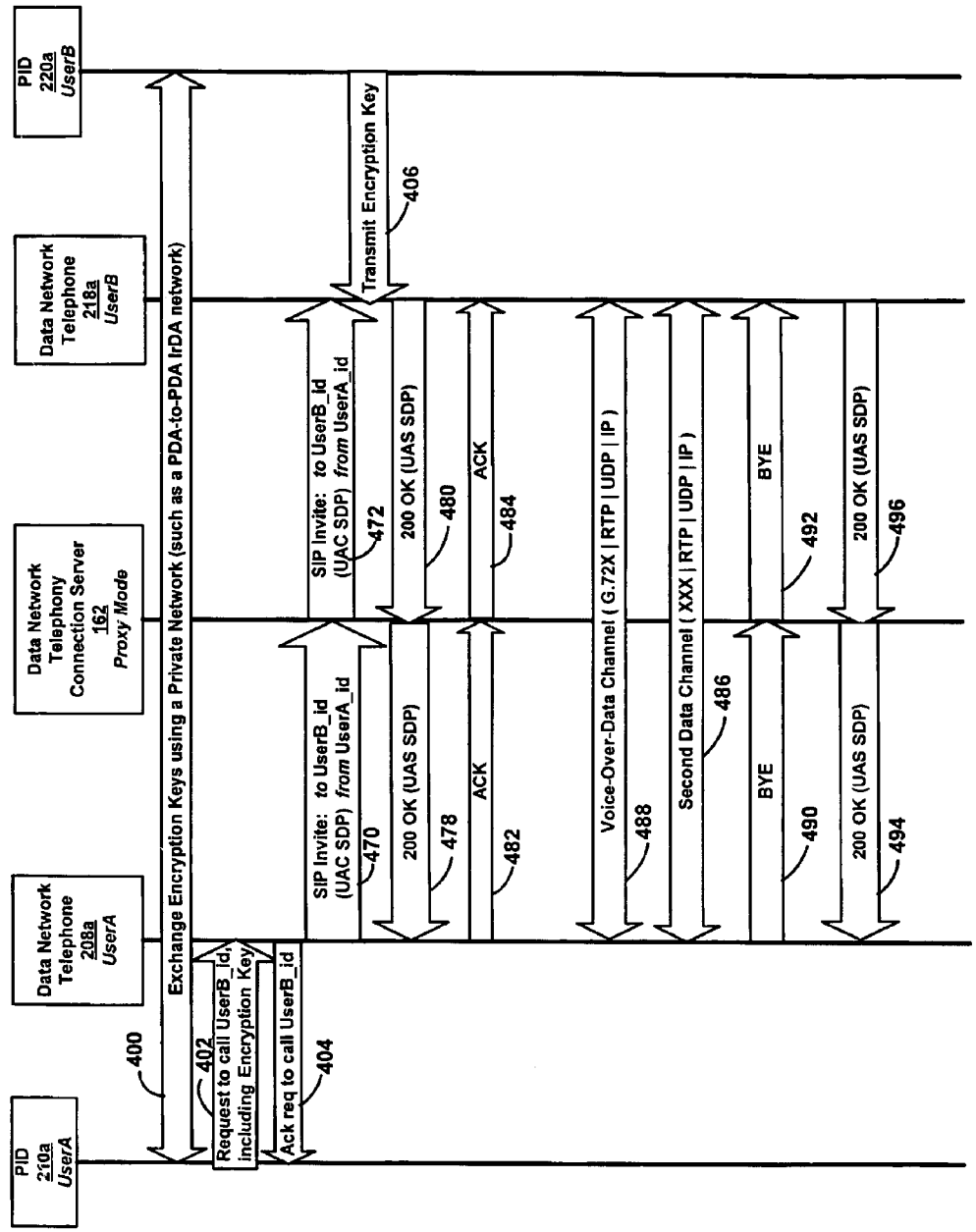
FIG. 8 is a message flow diagram illustrating exemplary message flow patterns that may occur in an encrypted call initiated by a PID.

FIG. 8 shows an example of the message flow patterns that may occur in enabling encryption and/or authentication over a telephony network using PIDs, according to one embodiment of the present invention. For the example shown in FIG. 8, SIP is illustrated as the call management protocol; however, other call management protocols may also be used.

The first important step in an encrypted call is for the communication partners (UserA and UserB in FIG. 8) to agree on an encryption and/or authentication scheme, algorithm, and key or key set. As part of this process, UserA may use the first PID 210a to receive encryption and/or authentication data from the PID 220a associated with UserB. In the example of FIG. 8, encryption and/or authentication keys are exchanged 400 between the first PID 210a and the second PID 220a using a private network, such as a PID-to-PID IrDA private network, or some other private network that is characterized by a low risk of a third party intercepting communications between the users of PIDs.

To initiate the call, the PID 210a associated with UserA transmits a request message 402 across the link 209a to the first data network telephone 208a to cause the first data network telephone 208a to attempt to place a call to UserB. In a preferred embodiment, UserA first selects UserB's name from an address book application on UserA's PID 210a. Address book applications for PIDs are known by those having skill in the art. An example of such an address book application is a contacts list stored in a PIDA (Personal Digital Assistant). The selected entry preferably includes contact information for UserB, including UserB's SIP URL and encryption and/or authentication data relating to UserB. UserB's SIP URL is generically referred to in FIG. 8 as UserB_id. Of course, other call-management protocols besides SIP may be used. Preferably the PID 210a transmits information (such as a SIP URL and encryption and/or authentication data) related to the communication partner selected by the user of the first PID 210a. In an alternative embodiment, UserA may instead initiate the call from the first data network telephone 208a, in which case UserA begins the telephone call by dialing User B's user identifier using the keypad 118 on the first data network telephone 208a. A second step would be to then transfer encryption and/or authentication data to the first data network telephone 208a from the PID 210a.

The SIP Invite message 470 from UserA at the data network telephone 208a is the request to initiate a call to UserB. The data network telephone 208a sends the request to initiate the call to the data network telephony connection server 162 providing service to UserB. (If the first data network telephone is not aware of the data network telephony connection server 162, the first data network telephone may instead reference a different server, such as a location server or a different data network telephony connection server, such as the first data network telephony connection server 150. The request to initiate the call to UserB includes UserB's user identifier (such as UserB's SIP URL) as the callee identifier, UserA's user identifier (such as UserA's SIP URL) as the caller identifier, and the protocols supported by UserA's data network telephone 208 (UserA's User Agent Client SDP).

In its role as a proxy server, the telephony connection server 162 sends the SIP Invite message 472 to the data network telephone 218a identified in the SIP database 164 (or determined from a location server) as being associated with UserB. UserB may cause the second PID 220a to transmit encryption/decryption and/or authentication data 406 to the second data network telephone 218a, to enable encryption and/or authentication services in both directions. The second data network telephone 218a responds to the INVITE message from the first data network telephone 208a with a response message 480 to the telephony connection server 162. The telephony connection server 162 receives the response message and sends the response message to UserA's data network telephone 208a as shown at 478.

User A's data network telephone 208a receives the response message and may prepare an acknowledgement message if called for by the protocol (e.g. the SIP protocol). If required, UserA's data network telephone 208a sends a SIP Acknowledgement message 482/484 to UserB's data network telephone 218a to complete the initiation of the telephone call.

Portions of the call set-up routine may be encrypted using the encryption and/or authentication keys exchanged 400.

UserA's data network telephone 208a preferably establishes a voice-over-data channel 488 with UserB's data network telephone 208b to permit voice communication between UserA and UserB. The voice-over-data channel 488 is preferably a data communications channel in which voice signals that have been converted to digital information are being carried as voice-over-data packets in accordance with a selected protocol, such as RTP over UDP/IP, as shown in FIG. 8. The voice-over-data packets include UserB's voice data in a first quantity of the voice-over-data packets, and contain UserA's voice data in a second quantity of the voice-over-data packets. UserB's voice-over-data packets and UserA's voice-over-data packets each include an IP protocol component, a UDP component, an RTP component and a G.72x component in the exemplary embodiment shown in FIG. 8. The voice-over-data packets on the voice-over-data channel 488 may be encrypted using the encryption and/or authentication data provided by the first PID 210a.

Also shown in FIG. 8 is a second data channel 486, which may be used to transmit graphical data, for example, for display on a data network telephone display screen 116, or on a PID display screen 105. For display on a PID screen, the graphical data is transmitted from a data network telephone, such as the first data network telephone 208a, to a PID, such as the first PID 210a. As such, the Users of PIDs 210a and 220a are able to utilize a shared workspace on their PIDs 210a and 220a while they participate in a conversation over the voice-over-data channel 488. In FIG. 8, the second data channel is shown as an RTP/UDP/IP channel. Other transport protocol implementations, such as TCP/IP, may also be utilized. The data packets on the second data channel 486 may also be encrypted using the encryption and/or authentication data provided by the first PID 210a.

The call is terminated when one of the parties signals the end of the call. In FIG. 8, UserA signals the end of the call by causing UserA's data network telephone 208a to send a BYE message 490/492 to UserB's data network telephone 218. UserB then sends a "200 OK" response message 494/496 to UserA.

The example shown in FIG. 8 illustrates a typical two-party call. In another embodiment of the present invention, encryption and/or authentication services may be provided for more than two parties in a call. For example, a three-party conference call between the UserA associated with the first PID 210a and the first data network telephone 208a, UserB associated with the third PID 220a and the third data network telephone 218a, and a UserC associated with the second PID 210b and the second data network telephone 208b may be set up.

1. Key Exchange for Asymmetric Encryption and/or Authentication

Asymmetric (two-key) cryptosystems require enciphering and deciphering keys that are different from each other. To enable encrypted communications in a public-key system, a user A must have a way of distributing his or her public key to communication partners.

Figure 9:
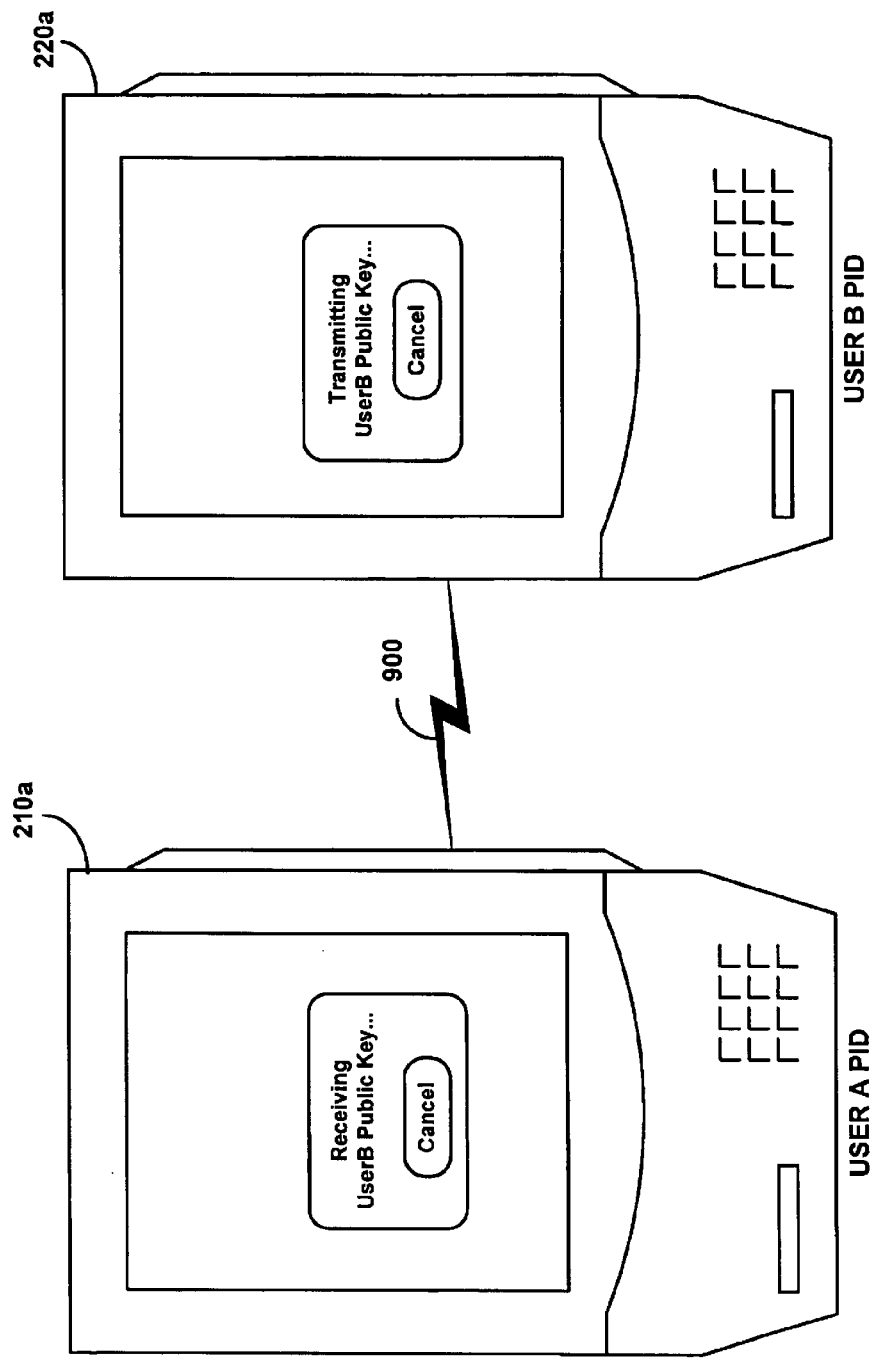
FIG. 9 is a pictorial and block diagram a key transfer operation according to a first embodiment of the present invention.

FIG. 9 is a block and pictorial diagram showing the first PID 210a and the second PID 220a in a public key transmission session. The first PID 210a is linked via a point-to-point link 900 to the second PID 220a. The point-to-point link 900 may be similar or identical to the link 209a between the first PID 210a and the first data network telephone 208a. For example, the first PID 210a and the second PID 220a may each contain an IrD$_A$ stack for exchanging the public key information.

In the public key transmission session of FIG. 9, the second PID 220a, associated with UserB, is transmitting UserB's public key to the first PID 210a so that UserA may send encrypted communications to UserB with the assistance of the first and second data network telephones 208a and 218a and the networks between them.

UserB's public key is preferably stored in a user attribute database in the second PID 220a. Since a private key is also required in an asymmetric encryption and/or authentication system, user attribute database may also contain such a private key, preferably in a location that is secure from unauthorized access.

Although the exemplary public key transmission shown in FIG. 9 appears as only a transmission from the second PID 220a to the first PID 210a, it may actually be part of a public key exchange session between the first and second PIDs 210a and 220a, in which both UserA and UserB are sharing their public keys through their respective PIDs 210a and 220a.

One preferred method for exchanging public keys is to execute an electronic business card exchange between two or more users, where encryption and/or authentication data is exchanged between PIDs as part of the electronic business card exchange. Electronic business card exchange applications are known by those having skill in the art. An example of such an application may be found in the Palm™ series of PIDAs offered by 3Com® Corporation.

Figure 10:
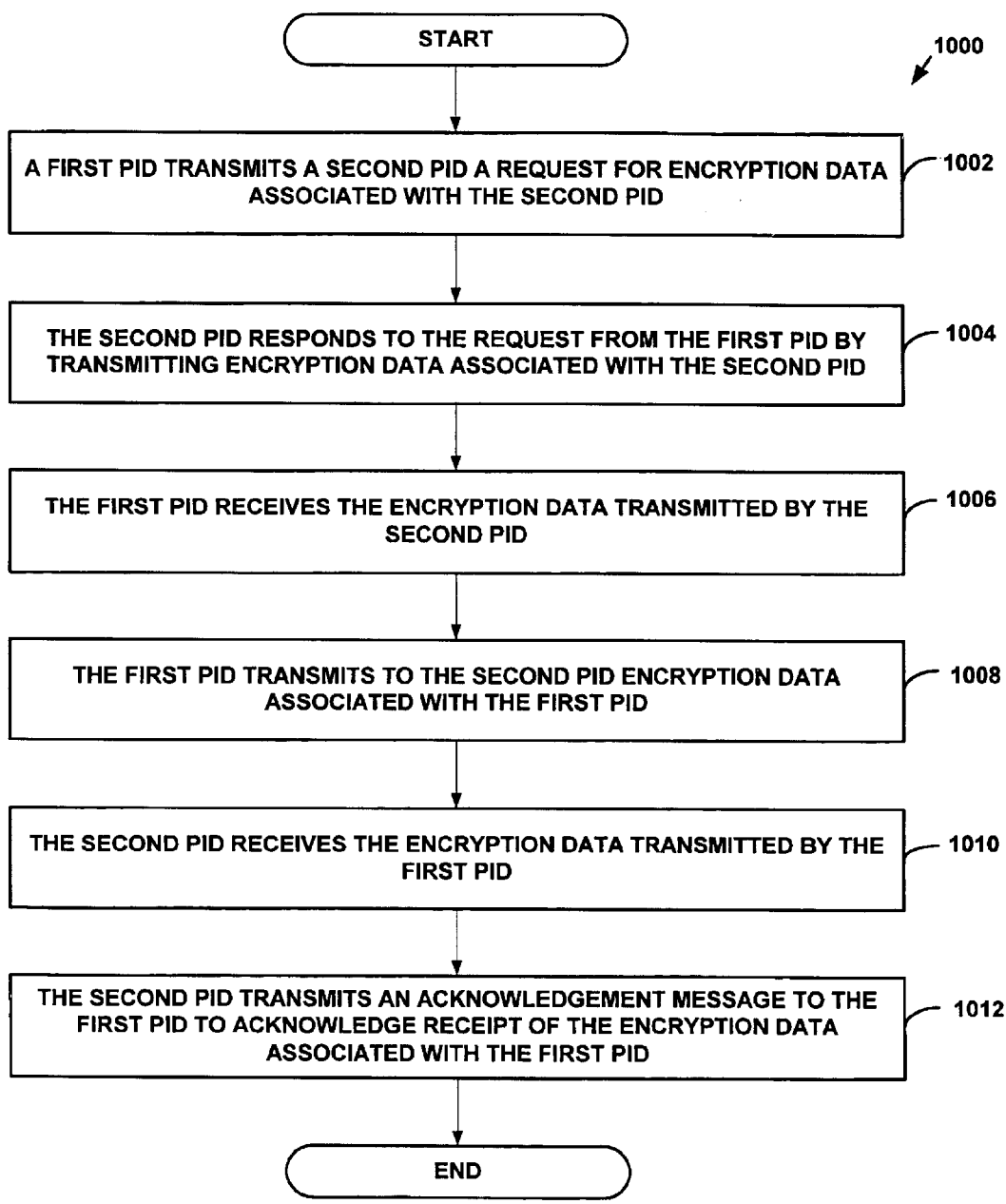
FIG. 10 is a flow diagram of a method for enabling encryption and/or authentication on telephony network according to a first embodiment of the present invention.

FIG. 10 is a flowchart showing a method 1000 for enabling encryption and/or authentication services on a telephony network according to a first embodiment of the present invention. A first PID, such as the first PID 210a associated with UserA, transmits a request for encryption and/or authentication data to a second PID 220a, such as the second PID 220a associated with UserA, as shown in step 1002. The second PID then responds to the request for encryption and/or authentication data by transmitting encryption and/or authentication data to the first PID, as shown in step 1004. For example, the second PID might transmit UserB's public key for an asymmetric cryptography system. In step 1006, the first PID receives the encryption and/or authentication data transmitted by the second PID, and preferably stores the information in an address book entry corresponding to UserB. In step 1008, the first PID transmits encryption and/or authentication data to the second PID. This may serve as acknowledgement to the second PID that the first PID received the encryption and/or authentication data from the second PID. Such an acknowledgement may include a copy of the encryption and/or authentication data from the second PID to verify that the encryption and/or authentication data was properly received. In step 1010, the second PID receives the encryption and/or authentication data transmitted by the first PID. The encryption and/or authentication data transmitted by the first PID may, for example, be UserA's public key in an asymmetric encryption and/or authentication system. In step 1012, the second PID preferably transmits an acknowledgement message back to the first PID to acknowledge proper receipt of the encryption and/or authentication data from the first PID. Again, a copy of the encryption and/or authentication data received may be included in the acknowledgement to verify that a proper transmission occurred.

The method 1000 is one example of an exchange of encryption and/or authentication data between two PIDs (and their associated users). Many variations of this exchange process will also work, and are intended to be within the scope of the present invention. For example, the request step 1002 could be replaced by a step in which the first PID immediately attempts to transmit encryption and/or authentication data to the second PID. In another variation, increased verification and error-checking functionality can be included in the method 1000 to better ensure proper transmission. It should also be noted that although the method 1000 shows a complete bilateral exchange, a one-way transmission is also possible and could include some of the steps shown in method 1000.

2. Key Exchange for Symmetric Encryption and/or Authentication

Symmetric (one-key) cryptosystems require enciphering and deciphering keys that are identical to each other or easily determinable from each other. Therefore the enciphering and deciphering keys constitute a shared secret between communication partners.

Figure 11:
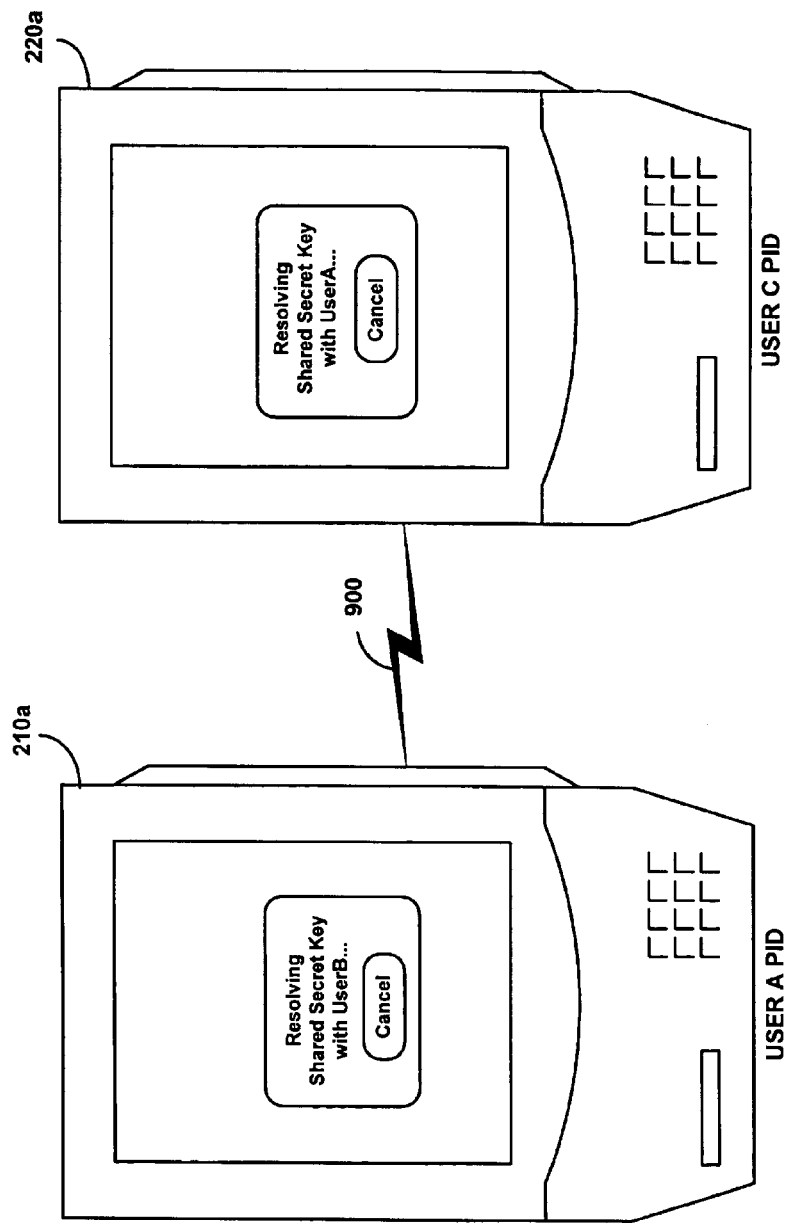
FIG. 11 is a pictorial and block diagram a key transfer operation according to a second embodiment of the present invention.

FIG. 11 is a block and pictorial diagram showing the first PID 210a and the second PID 220a in a shared secret resolution session according to an exemplary embodiment of the present invention. The first PIDD 210a is again linked via the point-to-point link 900 to the second PID 220a.

In a shared secret resolution session, the involved PIDs must ultimately agree on a common shared secret. There are numerous methods for accomplishing this resolution process, and while only several methods will be described here, other methods are also intended to be within the scope of the present invention. The first PID 210a associated with UserA and the second PID 220a associated with UserB will be referred to in illustrating several of the shared secret resolution methods.

In a first method for resolving a shared secret between the first PID 210a and the second PID 220a, one of the PIDs (such as the first PID 210a) begins transmitting a suggested shared secret (key) to the other PID (such as the second PID 220a). For example, the suggested shared secret may be generated by a random-number generator or pseudo-random-number generator within the first PID 210a. When the second PID 220a detects the transmitted suggested shared secret, the second PID 220a may accept or reject the suggested shared secret, or the second PID 220a may suggest an alternate shared secret, of which the first PID 210a may accept or reject. Upon accepting a suggested or alternate shared secret, the PIDs should each confirm the shared secret, and should each store the shared secret in a user attribute database (such as in a private "encryption and/or authentication" field in an address book application) located on each PID. If no agreement on a shared secret is reached after a predetermined number of attempts, the method can be repeated, modified, or abandoned.

In a second method for resolving a shared secret between the first PID 210a and the second PID 220a, one of the PIDs (such as the first PID 210a) begins transmitting a request to resolve a shared secret to the other PID (such as the second PID 220a). The second PID 220a may transmit a response message to the first PID 210a accepting or rejecting the request to resolve the shared secret. If the second PID 220a transmits an acceptance response, several options exist for the next step. One option is for both PIDs to transmit a suggested shared secret to the other PID and to select one of the shared secrets based on predetermined criteria, such as choosing the larger number if the shared secret is a number. Other exemplary criteria could include choosing based on having the smallest number of duplicate alphanumeric characters within the shared secret, or choosing an average of two shared secret numbers. Upon agreeing on a shared secret, the PIDs should each store the shared secret in a user attribute database (such as in a private "encryption and/or authentication" field in an address book application) located on each PID.

In a third method for resolving a shared secret between the first PID 210a and the second PID 220a, one of the PIDs (such as the first PID 210a) transmits a request to resolve a shared secret to the other PID (such as the second PID 220a). The second PID 220a may transmit a response message to the first PID 210a accepting or rejecting the request to resolve the shared secret. If the second PID 220a transmits an acceptance response, the shared secret may be determined by selecting the first (or any other) suggested shared secret transmitted (or received) by either PID. Timestamps may be used to establish time of transmission or receipt.

In a fourth method for resolving a shared secret between the first PID 210a and the second PID 220a, the user of one of the PIDs, such as UserA associated with the first PID 210a enters a suggested shared secret into the first PID 210a and transmits the shared secret to the second PID 220a, associated with UserB. UserA may agree on a shared secret with UserB beforehand, which may eliminate any conflict resolution steps that might be implemented in other methods for resolving shared secrets.

A preferred implementation of a shared secret resolution session occurs during an electronic business card exchange between two or more users, where encryption and/or authentication data (the resolved shared secret) is resolved between PIDs as part of the electronic business card exchange. Electronic business card exchange applications are known by those having skill in the art. An example of such an application may be found in the Palm™ series of PDAs offered by 3Com® Corporation.

Figure 12:
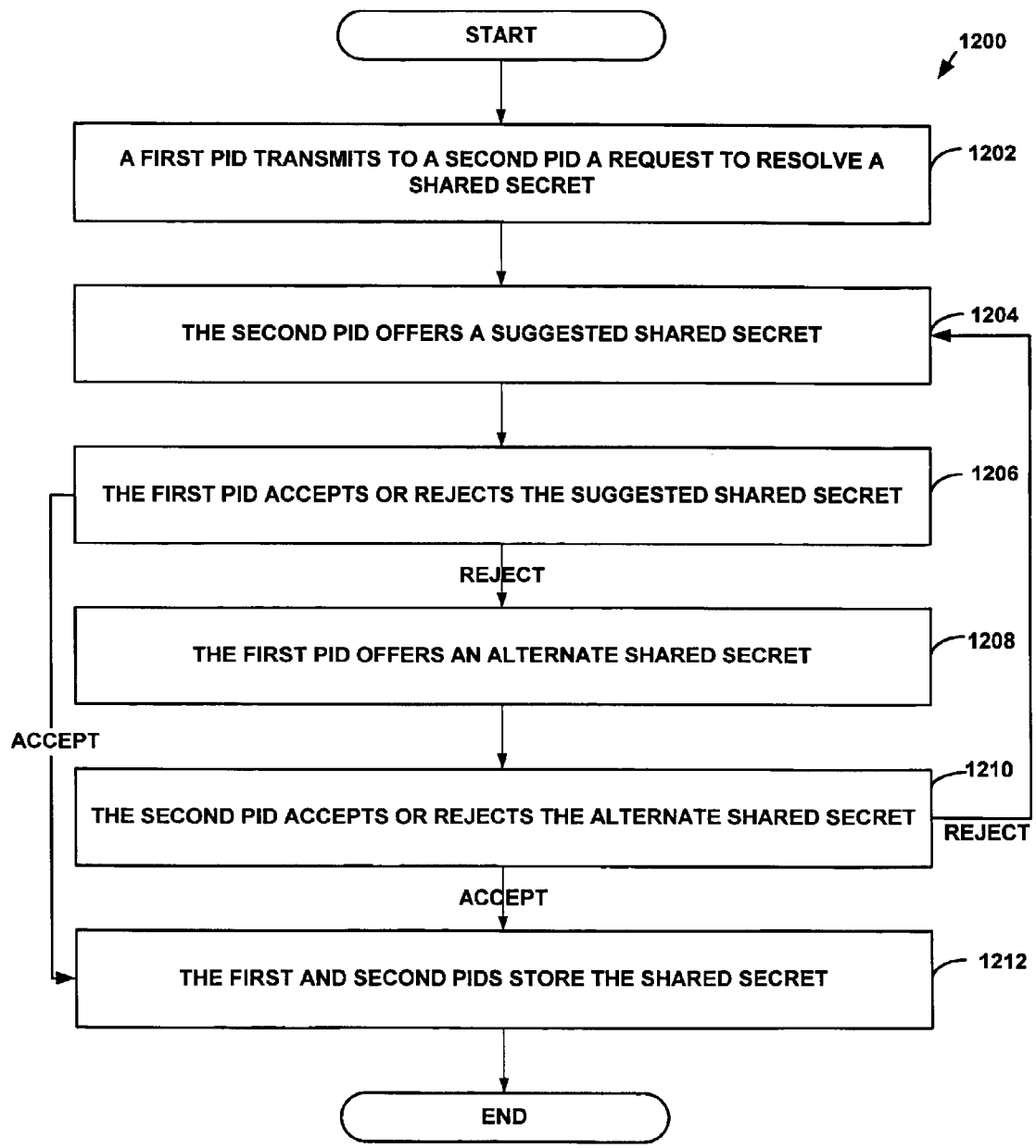
FIG. 12 is a flow diagram of a method for enabling encryption and/or authentication on telephony network according to a second embodiment of the present invention.

FIG. 12 is a flow diagram showing a method 1200 for enabling encryption and/or authentication services on a telephony network according to a second embodiment of the present invention. A first PID, such as the first PID 210a associated with UserA, transmits a request to resolve a shared secret to a second PID 220a, such as the second PID 220a associated with UserA, as shown in step 1202. The second PID then responds to the request by transmitting a suggested shared secret to the first PID, as shown in step 1204. The first PID can either accept or reject the suggested shared secret, as shown in step 1204. If the first PID accepts the suggested shared secret (e.g. because it meets predefined criteria such as a minimum length requirement), then the first and second PIDs each store the shared secret in a user attribute database (such as in a private "encryption and/or authentication" field in an address book application) located on each PID, as shown in step 1212. If the first PID rejects the suggested shared secret, then the first PID offers an alternate shared secret, as shown in step 1208. In 1210, the second PID accepts of rejects the alternate shared secret. If the second PID accepts the alternate shared secret, then the first and second PIDs each store the shared secret in a user attribute database (such as in a private "encryption and/or authentication" field in an address book application) located on each PID, as shown in step 1212. If the second PID rejects the alternate shared secret, then step 1204 is repeated, and the second PID offers a new suggested shared secret. The steps are repeated until an agreement is reached or a maximum number of attempts have been completed.

Figure 13:
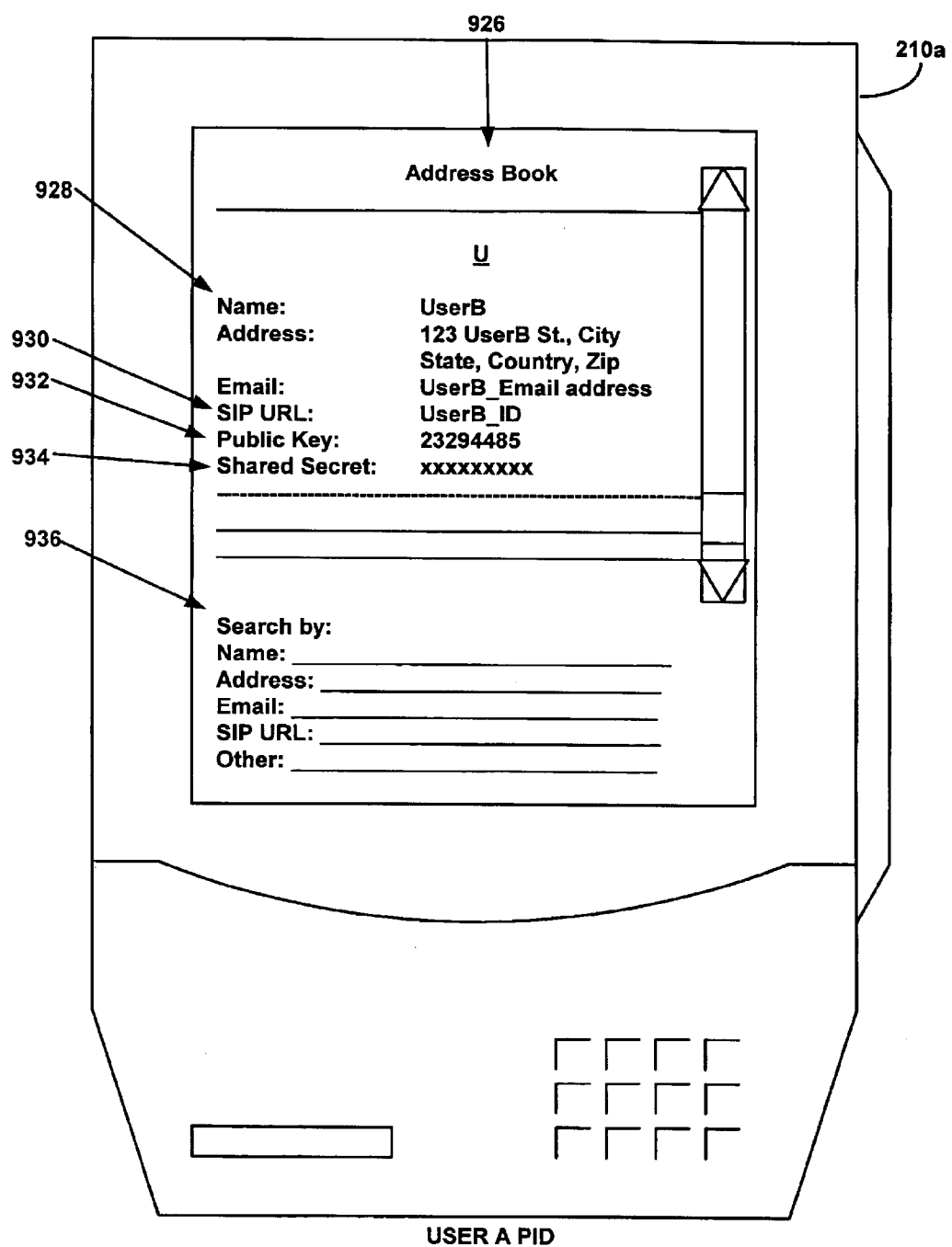
FIG. 13 is a pictorial diagram of a PID executing an address book application according to one embodiment of the present invention.

FIG. 13 is a pictorial diagram of the first PID 210*a* executing an address book application 926 according to one embodiment of the present invention. In this example, the first PID 210*a* is associated with UserA. Shown on a display screen of the first PID 210*a* is a contact entry 928 in the address book application 926. The contact entry 928 corresponds to the UserB. The contact entry 928 includes such fields as name, address, and email address fields. Also shown are a SIP URL field 930, which could also be any other user identifier, such as if SIP is not used as the call-management protocol. A "Public Key" field contains encryption and/or authentication data possibly received during an encryption and/or authentication data exchange or transmission session, such as for use in implementing an asymmetric encryption and/or authentication system. A "Shared Secret" field 934 is also shown, which may have been determined from a shared secret resolution session between UserA and UserB and their respective PIDs. The shared secret is shown as a hidden field; however, in some implementations the shared secret may be visible on the assumption that the shared secret is secure if UserA has exclusive control over the PID 210*a*. A search engine function 936 is also shown as part of the address book application 926 to allow a user to efficiently find entries in the address book application 926.

Not shown in FIG. 13 is an entry corresponding to the user associated with the PID 210*a*, which may be UserA, for example. Such an entry may include private keys associated with UserA to be used for providing encryption and/or authentication services in communications to UserA. The private keys are preferably in a hidden field to prevent unauthorized access to the keys. UserA's public key or keys are also preferably stored in UserA's address book entry, for exchange with other Users to enable encrypted communications.

While the invention has been described in conjunction with presently preferred embodiments of the invention, persons of skill in the art will appreciate that variations may be made without departure from the scope and spirit of the invention. For example, the access networks shown in FIG. 2 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A method for resolving a shared secret on a data network telephony system, the data network telephony system comprising a plurality of Portable Information Devices (PIDs) coupled to data network telephones within the data network telephony system, the method comprising in combination:

transmitting a suggested shared secret to one or more PIDSs from a first PID;

receiving the suggested shared secret on the one or more PIDs;

rejecting the suggested shared secret by at least one of the one or more PIDs and suggesting an alternative shared secret by the first PID prior to accepting the suggested shared secret at each of the one or more PIDs; and confirming the suggested shared secret by sending at least one acknowledgement message from the one or more PIDs to the first PID.

2. The method of claim 1 wherein the suggested shared secret is generated by a random-number within the first PID.

3. The method of claim 1 wherein the suggested shared secret is generated by a pseudo-random-number generator the first PID.

4. The method of claim 1 wherein the suggested shared secret is selected from the group consisting of encryption/authentication data, and encryption/decryption data.

5. The method of claim 1 wherein the suggested shared secret is accepted by at least one of the one or more PIDs by meeting a predetermined length requirement.

6. A method for resolving a shared secret on a data network telephony system, the data network telephony system comprising a plurality of Portable Information Devices (PIDs) coupled to data network telephones within the data network telephony system, the method comprising in combination:

transmitting a suggested shared secret to one or more PIDSs from a first PID;

receiving the suggested shared secret on the one or more PIDs;

transmitting a plurality of suggested shared secrets to at least one of the one or more PIDs by the first PID prior to confirming the suggested shared secret at the one or more PIDs; and confirming the suggested shared secret by sending at least one acknowledgement message from the one or more PIDs to the first PID.

7. The method of claim 6 wherein at least one of the one or more PIDs selects one of the plurality of suggested shared secrets based on criteria selected from the group consisting of a suggested shared secret length, a suggested shared secret alphanumeric character redundancy, a suggested shared secret averaging, a timestamp of transmission of suggested shared secrets, and a pre-selection of suggested shared secrets.

8. The method of claim 7 further comprising agreeing upon a selected suggested shared secret by at least one of the one or more PIDs and storing the agreed upon selected suggested shared secret.

9. The method of claim 8 wherein the at least one of the one or more PIDs stores the agreed upon selected suggested shared secret in a user attribute database within the at least one or more PIDs.

10. The method of claim 8 wherein the at least one of the one or more PIDs store the agreed upon selected suggested shared secret in a private encryption/authentication field in an address book application located within the at least one of the one or more PIDs.

11. The method of claim 6 wherein the suggested shared secret is generated by a random-number generator within the first PID.

12. The method of claim 6 wherein the suggested shared secret is generated by a pseudo-random-number generator the first PID.

13. The method of claim 6 wherein the suggested shared secret is selected from the group consisting of encryption/authentication data, and encryption/decryption data.

14. The method of claim 6 wherein the suggested shared secret is accepted by at least one of the one or more PIDs by meeting a predetermined length requirement.

15. A method for resolving a shared secret on a data network telephony system, the data network telephony system comprising a plurality of Portable Information Devices (PIDs) coupled to data network telephones within the data network telephony system, the method comprising an electronic business card exchange.

16. The method of claim 15 wherein the suggested shared secret is generated by a random-number generator within the first PID.

17. The method of claim 15 wherein the suggested shared secret is generated by a pseudo-random-number generator the first PID.

18. The method of claim 15 wherein the suggested shared secret is selected from the group consisting of encryption/authentication data, and encryption/decryption data.

19. The method of claim 15 wherein the suggested shared secret is accepted by at least one of the one or more PIDs by meeting a predetermined length requirement.

* * * * *